United States Patent
Gass et al.

(10) Patent No.: US 8,011,279 B2
(45) Date of Patent: Sep. 6, 2011

(54) POWER EQUIPMENT WITH SYSTEMS TO MITIGATE OR PREVENT INJURY

(75) Inventors: Stephen F. Gass, Wilsonville, OR (US); David S. D'Ascenzo, Portland, OR (US)

(73) Assignee: SD3, LLC, Tualatin, OR (US)

( * ) Notice: Subject to any disclaimer, the term of this patent is extended or adjusted under 35 U.S.C. 154(b) by 172 days.

(21) Appl. No.: 12/002,388

(22) Filed: Dec. 17, 2007

(65) Prior Publication Data

US 2008/0092702 A1 Apr. 24, 2008

Related U.S. Application Data

(63) Continuation of application No. 09/929,227, filed on Aug. 13, 2001, now Pat. No. 7,308,843.

(60) Provisional application No. 60/225,056, filed on Aug. 14, 2000, provisional application No. 60/225,057, filed on Aug. 14, 2000, provisional application No. 60/225,058, filed on Aug. 14, 2000, provisional application No. 60/225,059, filed on Aug. 14, 2000, provisional application No. 60/225,089, filed on Aug. 14, 2000, provisional application No. 60/225,094, filed on Aug. 14, 2000, provisional application No. 60/225,169, filed on Aug. 14, 2000, provisional application No. 60/225,170, filed on Aug. 14, 2000, provisional application No. 60/225,200, filed on Aug. 14, 2000, provisional application No. 60/225,201, filed on Aug. 14, 2000, provisional application No. 60/225,206, filed on Aug. 14, 2000, provisional application No. 60/225,210, filed on Aug. 14, 2000, provisional application No. 60/225,211, filed on Aug. 14, 2000, provisional application No. 60/225,212, filed on Aug. 14, 2000.

(51) Int. Cl.
*B26D 5/00* (2006.01)
*B27B 3/28* (2006.01)

(52) U.S. Cl. .................. 83/58; 83/59; 83/62.1; 83/581; 83/397.1; 83/477.1

(58) Field of Classification Search ................ 83/58, 59, 83/62.1, DIG. 1, 581, 397.1, 477.1, 577.2, 83/471; 144/3.1
See application file for complete search history.

(56) References Cited

U.S. PATENT DOCUMENTS 1,551,900 A 9/1925 Morrow
(Continued)

FOREIGN PATENT DOCUMENTS

CA 2140991 1/1995
(Continued)

OTHER PUBLICATIONS

U.S. Appl. No. 60/157,340, filed Oct. 1, 1999, entitled "Fast-Acting Safety Stop."

(Continued)

*Primary Examiner* — Ghassem Alie

(57) ABSTRACT

Woodworking machines are disclosed having cutting tools for cutting workpieces. The machines include a detection system adapted to detect one or more dangerous conditions between a person and the cutting tool. The machines also include a mechanism having a moveable component adapted to move upon detection of the dangerous condition by the detection system. Movement of the moveable component contributes to one or more of the following actions to mitigate or prevent injury to the person: deceleration of the cutting tool, retraction of the cutting tool, and placement of a barrier over at least a part of the cutting tool. An actuator is adapted to move the moveable component at a high acceleration when the dangerous condition is detected.

18 Claims, 24 Drawing Sheets

U.S. PATENT DOCUMENTS

| | | | |
|---|---|---|---|
| 1,584,086 A | | 5/1926 | Fonda |
| 2,434,174 A | | 1/1948 | Morgan |
| 2,785,710 A | | 3/1957 | Mowery, Jr |
| 3,785,230 A | * | 1/1974 | Lokey .......................... 30/388 |
| 3,858,095 A | * | 12/1974 | Friemann et al. ......... 192/129 A |
| 4,117,752 A | * | 10/1978 | Yoneda ............................. 83/58 |
| 4,453,112 A | | 6/1984 | Sauer et al. |
| 4,512,224 A | | 4/1985 | Terauchi |
| 4,637,289 A | | 1/1987 | Ramsden |
| 4,653,189 A | | 3/1987 | Andreasson |
| 4,965,909 A | | 10/1990 | McCullough et al. |
| 5,052,255 A | | 10/1991 | Gaines |
| 5,081,406 A | | 1/1992 | Hughes et al. |
| 5,205,069 A | * | 4/1993 | Shapiro ............................. 49/31 |
| 5,272,946 A | | 12/1993 | McCullough et al. |
| 5,377,554 A | | 1/1995 | Reulein et al. |
| 5,422,551 A | | 6/1995 | Takeda et al. |
| 5,942,975 A | | 8/1999 | Sorensen |
| 6,418,829 B1 | | 7/2002 | Pilchowski |
| 6,900,728 B2 | | 5/2005 | Metzger, Jr. |
| 6,922,153 B2 | | 7/2005 | Pierga et al. |
| 6,959,631 B2 | | 11/2005 | Sako |
| 7,009,552 B2 | | 3/2006 | Sako |
| 7,047,854 B2 | | 5/2006 | Sako |
| 7,084,779 B2 | | 8/2006 | Uneyama |
| 7,173,537 B2 | | 2/2007 | Voigtlaender |
| 7,308,843 B2 | * | 12/2007 | Gass et al. ......................... 83/58 |
| 7,373,863 B2 | | 5/2008 | O'Banion et al. |
| 7,421,932 B1 | | 9/2008 | Heinzmann et al. |
| 2004/0060404 A1 | | 4/2004 | Metzger, Jr. |
| 2004/0123709 A1 | | 7/2004 | Metzger, Jr. |
| 2004/0159198 A1 | | 8/2004 | Peot et al. |
| 2004/0194594 A1 | | 10/2004 | Dils et al. |
| 2004/0200329 A1 | | 10/2004 | Sako |
| 2004/0226424 A1 | | 11/2004 | O'Banion et al. |
| 2004/0226800 A1 | | 11/2004 | Pierga et al. |
| 2005/0057206 A1 | | 3/2005 | Uneyama |
| 2005/0145080 A1 | | 7/2005 | Voigtlaender |
| 2005/0268767 A1 | | 12/2005 | Pierga et al. |
| 2006/0096425 A1 | | 5/2006 | Keller |
| 2006/0101960 A1 | | 5/2006 | Smith et al. |
| 2008/0016998 A1 | | 1/2008 | Keller |
| 2008/0173147 A1 | | 7/2008 | Kovarik et al. |
| 2008/0196565 A1 | | 8/2008 | Eppard |
| 2008/0196991 A1 | | 8/2008 | Eppard |
| 2008/0200263 A1 | | 8/2008 | Eppard |

FOREIGN PATENT DOCUMENTS

| | | |
|---|---|---|
| DE | 76186 | 8/1921 |
| DE | 2917497 | 4/1979 |
| DE | 3427733 | 1/1986 |
| DE | 4326313 | 2/1995 |
| DE | 19609771 | 6/1998 |
| DE | 20102704 | 2/2001 |
| EP | 0362937 | 4/1990 |
| WO | WO 03/006213 | 1/2003 |

OTHER PUBLICATIONS

U.S. Appl. No. 60/182,866, filed Feb. 16, 2000, entitled "Fast-Acting Safety Stop."

IWF 2000 Challengers Award Official Entry Form, submitted Apr. 26, 2000, 6 pages plus CD (the portions of U.S. patent applications referenced in the form are from U.S. App. No. 60/157,340, filed Oct. 1, 1999 and U.S. Appl. No. 60/182,866, filed Feb. 16, 2000).

Two photographs of a saw displayed at a trade show on Aug. 23, 2000.

*You Should Have Invented It*, French television show video.

* cited by examiner

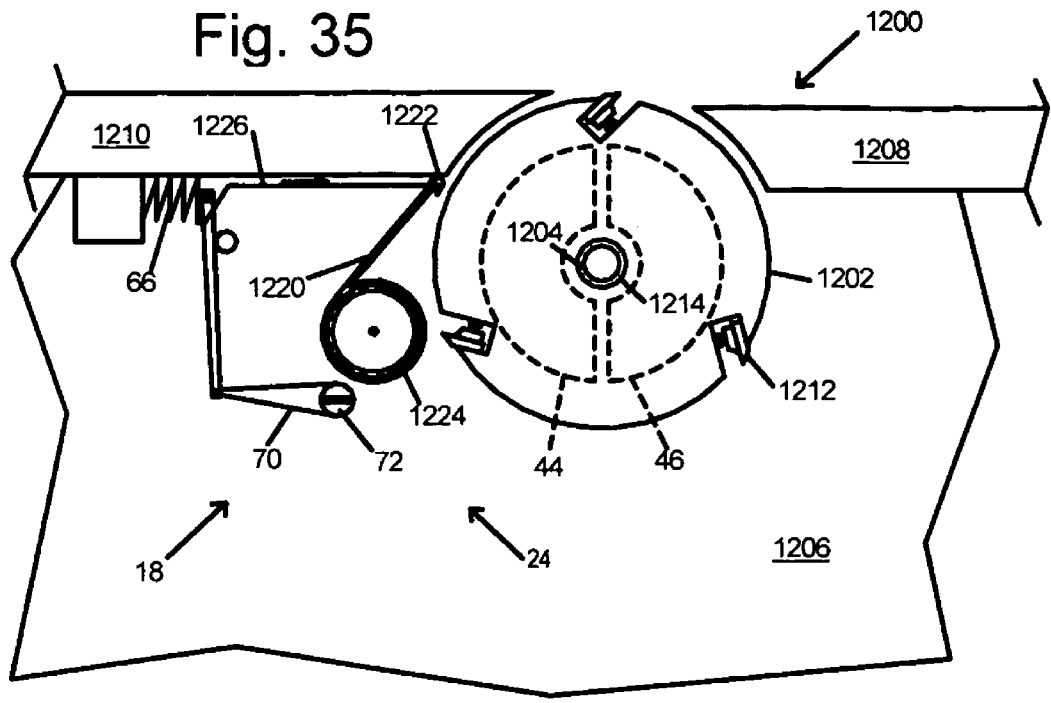
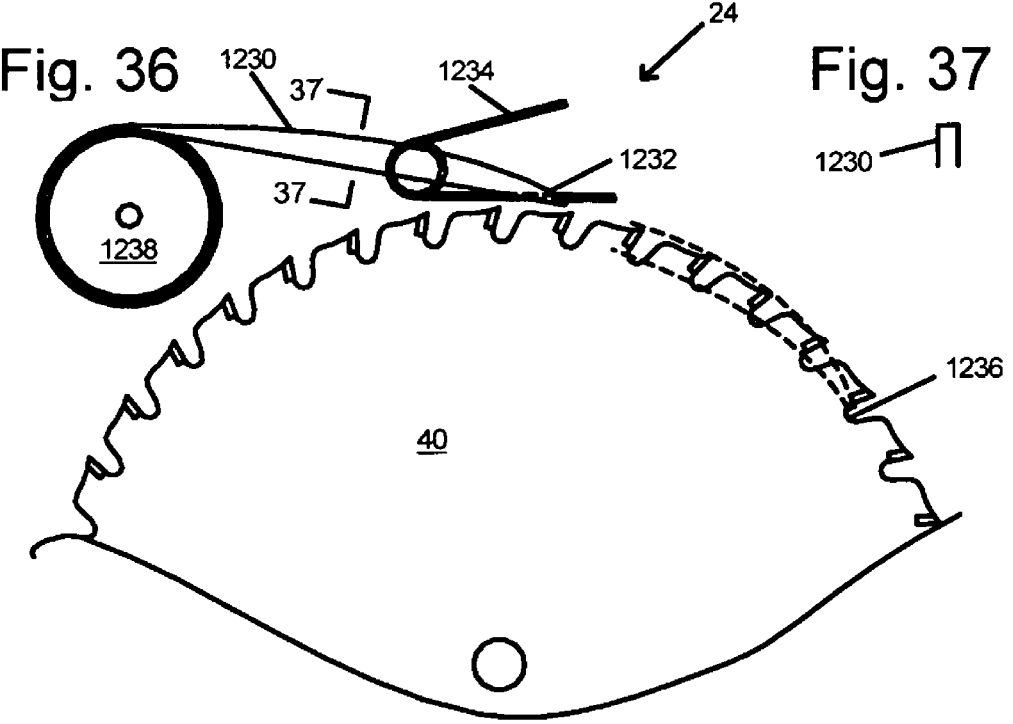

POWER EQUIPMENT WITH SYSTEMS TO MITIGATE OR PREVENT INJURY

CROSS-REFERENCE TO RELATED APPLICATIONS

This application is a continuation of U.S. patent application Ser. No. 09/929,227, filed Aug. 13, 2001, issuing as U.S. Pat. No. 7,308,843 on Dec. 18, 2007, which in turn claimed the benefit of and priority from the following U.S. Provisional Patent Applications: Ser. No. 60/225,056, filed Aug. 14, 2000, Ser. No. 60/225,057, filed Aug. 14, 2000, Ser. No. 60/225,058, filed Aug. 14, 2000, Ser. No. 60/225,059, filed Aug. 14, 2000, Ser. No. 60/225,089, filed Aug. 14, 2000, Ser. No. 60/225,094, filed Aug. 14, 2000, Ser. No. 60/225,169, filed Aug. 14, 2000, Ser. No. 60/225,170, filed Aug. 14, 2000, Ser. No. 60/225,200, filed Aug. 14, 2000, Ser. No. 60/225,201, filed Aug. 14, 2000, Ser. No. 60/225,206, filed Aug. 14, 2000, Ser. No. 60/225,210, filed Aug. 14, 2000, Ser. No. 60/225,211, filed Aug. 14, 2000, and Ser. No. 60/225,212, filed Aug. 14, 2000.

FIELD

The present invention relates to safety systems for power equipment, and more particularly to a spring-biased brake mechanism for use on power equipment, such as woodworking machines.

BACKGROUND

Safety systems are often employed with power equipment such as table saws, miter saws, band saws, jointers, shapers, circular saws and other woodworking machinery, to minimize the risk of injury when using the equipment. Probably the most common safety feature is a guard that physically blocks an operator from making contact with dangerous components of machinery, such as belts, shafts or blades. In many cases, guards effectively reduce the risk of injury, however, there are many instances where the nature of the operations to be performed precludes using a guard that completely blocks access to hazardous machine parts.

The present invention discloses a safety system, and power equipment incorporating a safety system, that includes a spring-biased brake mechanism adapted to engage the blade or other cutting tool to protect the user against serious injury if a dangerous, or triggering, condition, such as contact between the user's body and the blade or other cutting tool, occurs. The brake mechanism includes a pawl that is biased to engage and quickly stop the blade or other cutting tool.

BRIEF DESCRIPTION OF THE DRAWINGS

FIG. 35 is a breakaway side elevation view of a reaction system according to the present invention.

FIG. 36 is a schematic view of an alternative reaction system according to the present invention.

FIG. 37 is a cross-sectional view along lines 37-37 of FIG. 36 of a band forming part of the reaction system of FIG. 36.

DETAILED DESCRIPTION

Figure 1:
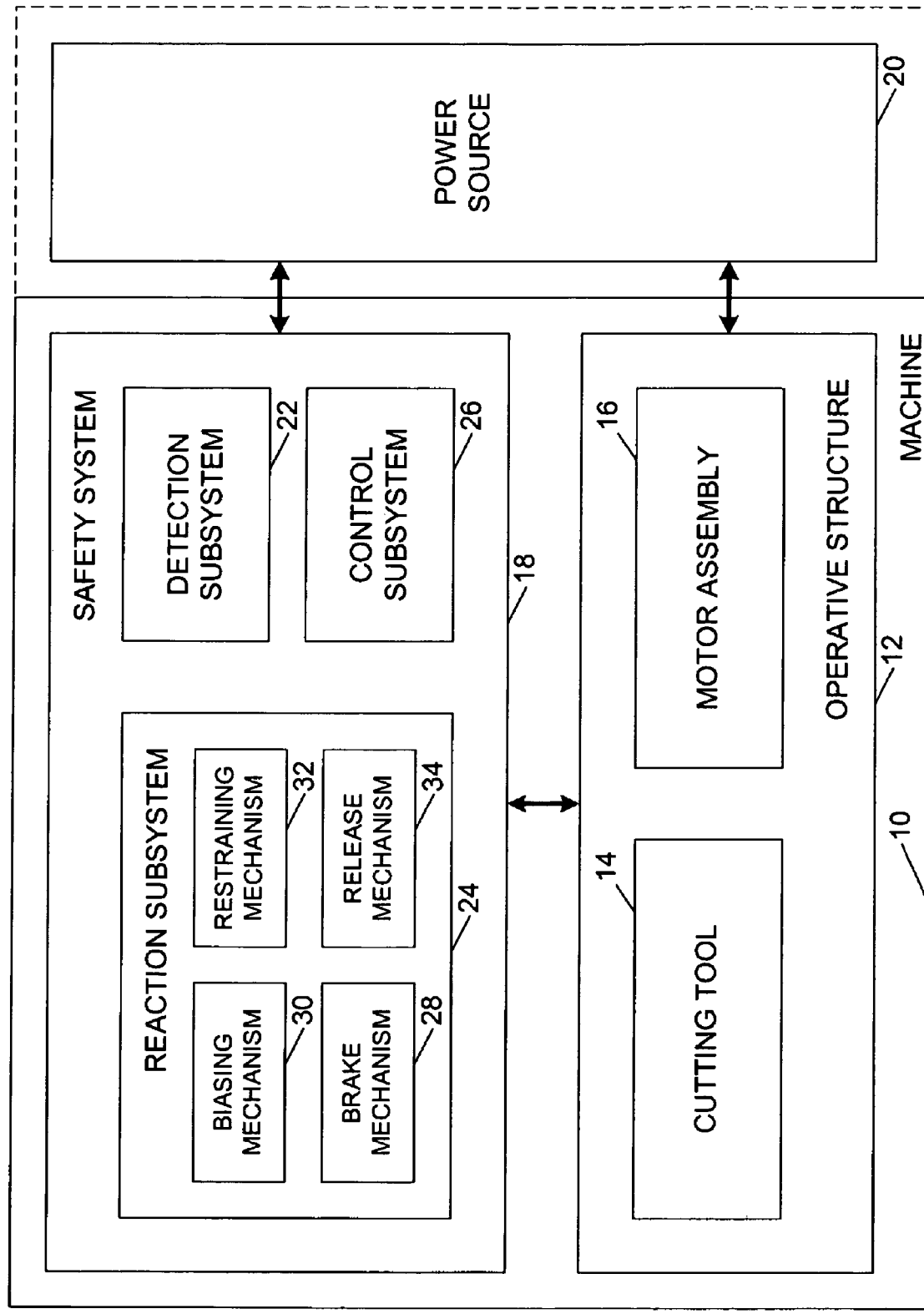
FIG. 1 is a schematic block diagram of a machine with a fast-acting safety system according to the present invention.

A machine is shown schematically in FIG. 1 and indicated generally at 10. Machine 10 may be any of a variety of different machines adapted for cutting workpieces, such as wood, including a table saw, miter saw (chop saw), radial arm saw, circular saw, band saw, jointer, planer, etc. Machine 10 includes an operative structure 12 having a cutting tool 14 and a motor assembly 16 adapted to drive the cutting tool. Machine 10 also includes a safety system 18 configured to minimize the potential of a serious injury to a person using machine 10. Safety system 18 is adapted to detect the occurrence of one or more dangerous, or triggering, conditions during use of machine 10. If such a dangerous condition is detected, safety system 18 is adapted to engage operative structure 12 to limit any injury to the user caused by the dangerous condition.

Machine 10 also includes a suitable power source 20 to provide power to operative structure 12 and safety system 18. Power source 20 may be an external power source such as line current, or an internal power source such as a battery. Alternatively, power source 20 may include a combination of both external and internal power sources. Furthermore, power source 20 may include two or more separate power sources, each adapted to power different portions of machine 10.

It will be appreciated that operative structure 12 may take any one of many different forms, depending on the type of machine 10. For example, operative structure 12 may include a stationary housing configured to support motor assembly 16 in driving engagement with cutting tool 14. Alternatively, operative structure 12 may include a movable structure configured to carry cutting tool 14 between multiple operating positions. As a further alternative, operative structure 12 may include one or more transport mechanisms adapted to convey a workpiece toward and/or away from cutting tool 14.

Motor assembly 16 includes one or more motors adapted to drive cutting tool 14. The motors may be either directly or indirectly coupled to the cutting tool, and may also be adapted to drive workpiece transport mechanisms. Cutting tool 14 typically includes one or more blades or other suitable cutting implements that are adapted to cut or remove portions from the workpieces. The particular form of cutting tool 14 will vary depending upon the various embodiments of machine 10. For example, in table saws, miter saws, circular saws and radial arm saws, cutting tool 14 will typically include one or more circular rotating blades having a plurality of teeth disposed along the perimetrical edge of the blade. For a jointer or planer, the cutting tool typically includes a plurality of radially spaced-apart blades. For a band saw, the cutting tool includes an elongate, circuitous tooth-edged band.

Safety system 18 includes a detection subsystem 22, a reaction subsystem 24 and a control subsystem 26. Control subsystem 26 may be adapted to receive inputs from a variety of sources including detection subsystem 22, reaction subsystem 24, operative structure 12 and motor assembly 16. The control subsystem may also include one or more sensors adapted to monitor selected parameters of machine 10. In addition, control subsystem 26 typically includes one or more instruments operable by a user to control the machine. The control subsystem is configured to control machine 10 in response to the inputs it receives.

Detection subsystem 22 is configured to detect one or more dangerous, or triggering, conditions during use of machine 10. For example, the detection subsystem may be configured to detect that a portion of the user's body is dangerously close to, or in contact with, a portion of cutting tool 14. As another example, the detection subsystem may be configured to detect the rapid movement of a workpiece due to kickback by the cutting tool, as is described in U.S. Provisional Patent Application Ser. No. 60/182,866, filed Feb. 16, 2000, the disclosure of which is herein incorporated by reference. In some embodiments, detection subsystem 22 may inform control subsystem 26 of the dangerous condition, which then activates reaction subsystem 24. In other embodiments, the detection subsystem may be adapted to activate the reaction subsystem directly.

Once activated in response to a dangerous condition, reaction subsystem 24 is configured to engage operative structure 12 quickly to prevent serious injury to the user. It will be appreciated that the particular action to be taken by reaction subsystem 24 will vary depending on the type of machine 10 and/or the dangerous condition that is detected. For example, reaction subsystem 24 may be configured to do one or more of the following: stop the movement of cutting tool 14, disconnect motor assembly 16 from power source 20, place a barrier between the cutting tool and the user, or retract the cutting tool from its operating position, etc. The reaction subsystem may be configured to take a combination of steps to protect the user from serious injury. Placement of a barrier between the cutting tool and teeth is described in more detail in U.S. Provisional Patent Application Ser. No. 60/225,206, filed Aug. 14, 2000, entitled "Cutting Tool Safety System," and U.S. Pat. No. 6,920,814, filed Aug. 13, 2001, entitled "Cutting Tool Safety System," the disclosures of which are herein incorporated by reference. Retraction of the cutting tool from its operating position is described in more detail in U.S. Provisional Patent Application Ser. No. 60/225,089, filed Aug. 14, 2000, entitled "Retraction System For Use In Power Equipment," and U.S. patent application Ser. No. 09/929,242, filed Aug. 13, 2001, entitled "Retraction System For Use In Power Equipment," the disclosures of which are herein incorporated by reference.

The configuration of reaction subsystem 24 typically will vary depending on which action(s) are taken. In the exemplary embodiment depicted in FIG. 1, reaction subsystem 24 is configured to stop the movement of cutting tool 14 and includes a brake mechanism 28, a biasing mechanism 30, a restraining mechanism 32, and a release mechanism 34. Brake mechanism 28 is adapted to engage operative structure 12 under the urging of biasing mechanism 30. During normal operation of machine 10, restraining mechanism 32 holds the brake mechanism out of engagement with the operative structure. However, upon receipt of an activation signal by reaction subsystem 24, the brake mechanism is released from the restraining mechanism by release mechanism 34, whereupon, the brake mechanism quickly engages at least a portion of the operative structure to bring the cutting tool to a stop.

Figure 2:
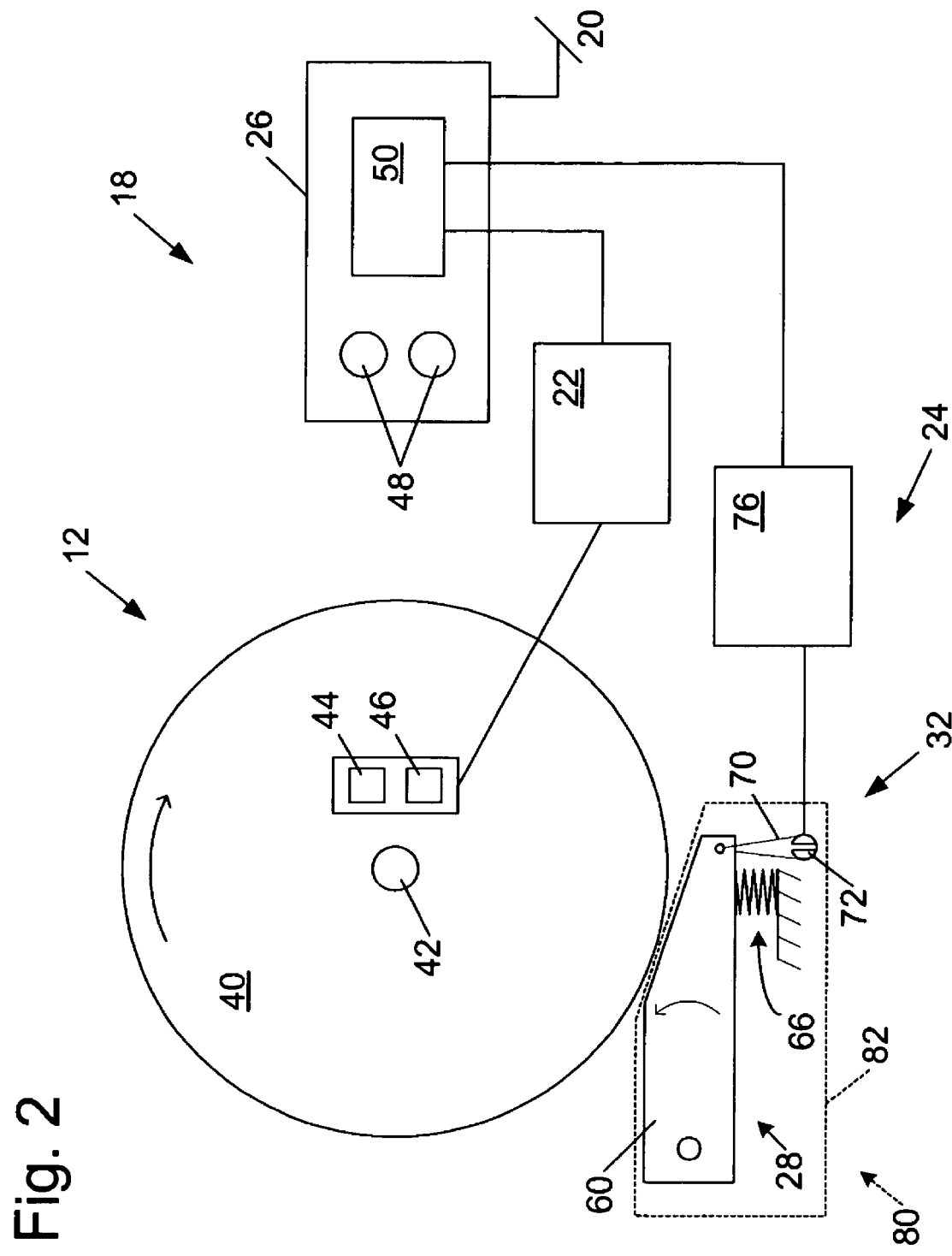
FIG. 2 is a schematic diagram of an exemplary safety system in the context of a machine having a circular blade.

It will be appreciated by those of skill in the art that the exemplary embodiment depicted in FIG. 1 and described above may be implemented in a variety of ways depending on the type and configuration of operative structure 12. Turning attention to FIG. 2, one example of the many possible implementations of safety system 18 is shown. System 18 is configured to engage an operative structure having a cutting tool in the form of a circular blade 40 mounted on a rotating shaft or arbor 42. Blade 40 includes a plurality of cutting teeth (not shown) disposed around the outer edge of the blade. As described in more detail below, braking mechanism 28 is adapted to engage the teeth of blade 40 and stop the rotation of the blade. U.S. Provisional Patent Application Ser. No. 60/225,210, filed Aug. 14, 2000, entitled "Translation Stop For Use In Power Equipment," and U.S. Pat. No. 7,137,326, filed Aug. 13, 2001, entitled "Translation Stop For Use In Power Equipment," the disclosures of which are herein incorporated by reference, describes other systems for stopping the movement of the cutting tool. U.S. Provisional Patent Application Ser. No. 60/225,058, filed Aug. 14, 2000, entitled "Table Saw With Improved Safety System," U.S. patent application Ser. No. 09/929,235, filed Aug. 13, 2001, entitled "Table Saw With Improved Safety System," U.S. Provisional Patent Application Ser. No. 60/225,057, filed Aug. 14, 2000, entitled "Miter Saw With Improved Safety System," and U.S. patent application Ser. No. 09/929,238, filed Aug. 13, 2001, entitled "Miter Saw With Improved Safety System," the disclosures of which are herein incorporated by reference, describe safety system 18 in the context of particular types of machines 10.

In the exemplary implementation, detection subsystem 22 is adapted to detect the dangerous condition of the user coming into contact with blade 40. The detection subsystem includes a sensor assembly, such as contact detection plates 44 and 46, capacitively coupled to blade 40 to detect any contact between the user's body and the blade. Typically, the blade, or some larger portion of cutting tool 14 is electrically isolated from the remainder of machine 10. Alternatively, detection subsystem 22 may include a different sensor assembly configured to detect contact in other ways, such as optically, resistively, etc. In any event, the detection subsystem is adapted to transmit a signal to control subsystem 26 when contact between the user and the blade is detected. Various exemplary embodiments and implementations of detection subsystem 22 are described in more detail in U.S. Provisional Patent Application Ser. No. 60/225,200, filed Aug. 14, 2000, entitled "Contact Detection System For Power Equipment," U.S. Pat. No. 7,210,383, filed Aug. 13, 2001, entitled "Detection System for Power Equipment," U.S. Provisional Patent Application Ser. No. 60/225,211, filed Aug. 14, 2000, entitled "Apparatus And Method For Detecting Dangerous Conditions In Power Equipment," and U.S. Pat. No. 7,284,467, filed Aug. 13, 2001, entitled "Apparatus And Method For Detecting Dangerous Conditions In Power Equipment," the disclosures of which are herein incorporated by reference.

Control subsystem 26 includes one or more instruments 48 that are operable by a user to control the motion of blade 40. Instruments 48 may include start/stop switches, speed controls, direction controls, etc. Control subsystem 26 also includes a logic controller 50 connected to receive the user's inputs via instruments 48. Logic controller 50 is also connected to receive a contact detection signal from detection subsystem 22. Further, the logic controller may be configured to receive inputs from other sources (not shown) such as blade motion sensors, workpiece sensors, etc. In any event, the logic controller is configured to control operative structure 12 in response to the user's inputs through instruments 48. However, upon receipt of a contact detection signal from detection subsystem 22, the logic controller overrides the control inputs from the user and activates reaction subsystem 24 to stop the motion of the blade. Various exemplary embodiments and implementations of control subsystem 26 are described in more detail in U.S. Provisional Patent Application Ser. No. 60/225,059, filed Aug. 14, 2000, entitled "Logic Control For Fast-Acting Safety System," U.S. patent application Ser. No. 09/929,237, filed Aug. 13, 2001, entitled "Logic Control For Fast-Acting Safety System," U.S. Provisional Patent Application Ser. No. 60/225,094, filed Aug. 14, 2000, entitled "Motion Detecting System For Use In Safety System For Power Equipment," and U.S. Pat. No. 7,225,712, filed Aug. 13, 2001, entitled "Motion Detecting System For Use In A Safety System For Power Equipment," the disclosures of which are herein incorporated by reference.

In the exemplary implementation, brake mechanism 28 includes a pawl 60 mounted adjacent the edge of blade 40 and selectively moveable to engage and grip the teeth of the blade. Pawl 60 may be constructed of any suitable material adapted to engage and stop the blade. As one example, the pawl may be constructed of a relatively high strength thermoplastic material such as polycarbonate or Acrylonitrile Butadiene Styrene (ABS), etc., or a metal such as aluminum, etc. It will be appreciated that the construction of pawl 60 will vary depending on the configuration of blade 40. In any event, the pawl is urged into the blade by a biasing mechanism in the form of a spring 66. In the illustrative embodiment shown in FIG. 2, pawl 60 is pivoted into the teeth of blade 40. It should be understood that sliding or rotary movement of pawl 60 may also be used. The spring is adapted to urge pawl 60 into the teeth of the blade with sufficient force to grip the blade and quickly bring it to a stop.

The pawl is held away from the edge of the blade by a restraining mechanism in the form of a fusible member 70. The fusible member is constructed of a suitable material adapted to restrain the pawl against the bias of spring 66, and also adapted to melt under a determined electrical current density. Examples of suitable materials for fusible member 70 include NiChrome wire, stainless steel wire, etc. The fusible member is connected between the pawl and a contact mount 72. Preferably, fusible member 70 holds the pawl relatively close to the edge of the blade to reduce the distance the pawl must travel to engage the blade. Positioning the pawl relatively close to the edge of the blade reduces the time required for the pawl to engage and stop the blade. Typically, the pawl is held approximately 1/32-inch to 1/4-inch from the edge of the blade by fusible member 70, however other pawl-to-blade spacings may also be used within the scope of the invention.

Pawl 60 is released from its unactuated, or cocked, position to engage blade 40 by a release mechanism in the form of a firing subsystem 76. The firing subsystem is coupled to contact mount 72, and is configured to melt fusible member 70 by passing a surge of electrical current through the fusible member. Firing subsystem 76 is coupled to logic controller 50 and activated by a signal from the logic controller. When the logic controller receives a contact detection signal from detection subsystem 22, the logic controller sends an activation signal to firing subsystem 76, which melts fusible member 70, thereby releasing the pawl to stop the blade. Various exemplary embodiments and implementations of reaction subsystem 24 are described in more detail in U.S. Provisional Patent Application Ser. No. 60/225,056, filed Aug. 14, 2000, entitled "Firing Subsystem For Use In A Fast Acting Safety System," U.S. Pat. No. 7,100,483, filed Aug. 13, 2001, entitled "Firing Subsystem For Use In A Fast-Acting Safety System," U.S. Provisional Patent Application Ser. No.

60/225,169, filed Aug. 14, 2000; entitled "Brake Mechanism For Power Equipment," and U.S. Pat. No. 7,024,975, filed Aug. 13, 2001, entitled "Brake Mechanism For Power Equipment," the disclosures of which are herein incorporated by reference.

Figure 22:
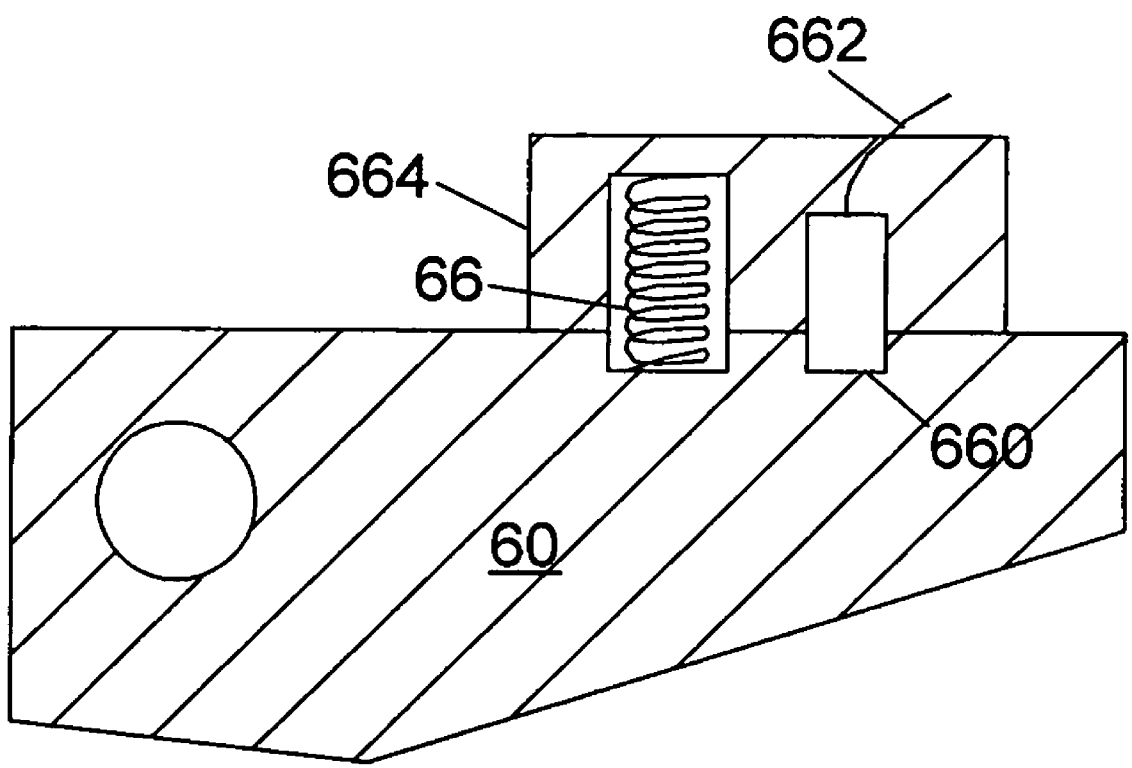
FIG. 22 shows an explosive charge that can be triggered by a firing subsystem.

Firing system 76 may also be used to trigger some action other than burning a fusible member. For example, firing system 76 can fire a small explosive charge to move a pawl. FIG. 22 shows a relatively small, self-contained explosive charge 660 in the form of a squib or detonator that can be used to drive pawl 60 against a blade. An example of a suitable explosive charge is an M-100 detonator available, for example, from Stresau Laboratory, Inc., of Spooner, Wis. The self-contained charge or squib focuses the force of the explosion along the direction of movement of the pawl. A trigger line 662 extends from the charge, and it may be connected to firing system 76 to trigger detonation. Any suitable explosive charge system may be used.

Explosive charge 660 can be used to move pawl 60 by inserting the charge between the pawl and a stationary block 664 adjacent the charge. When the charge detonates, the pawl is pushed away from the block. A compression spring 66 is placed between the block and pawl to ensure the pawl does not bounce back from the blade when the charge is detonated. Prior to detonation, the pawl is held away from the blade by the friction-fit of the charge in both the block and pawl. However, the force created upon detonation of the charge is more than sufficient to overcome the friction fit. Alternatively, the pawl may be held away from the blade by other mechanisms such as a frangible member, gravity, a spring between the pawl and block, etc.

Firing system 76 may also trigger a DC solenoid, which can be over-driven with a current surge to create a rapid displacement, a pressurized air or gas cylinder to supply the pressure in place of the spring or charge, or an electromagnet to either repel the pawl against the blade or to release a spring-loaded pawl toward the blade.

It will be appreciated that activation of the brake mechanism will require the replacement of one or more portions of safety system 18. For example, pawl 60 and fusible member 70 typically must be replaced before the safety system is ready to be used again. Thus, it may be desirable to construct one or more portions of safety system 18 in a cartridge that can be easily replaced. For example, in the exemplary implementation depicted in FIG. 2, safety system 18 includes a replaceable cartridge 80 having a housing 82. Pawl 60, spring 66, fusible member 70 and contact mount 72 are all mounted within housing 82. Alternatively, other portions of safety system 18 may be mounted within the housing. In any event, after the reaction system has been activated, the safety system can be reset by replacing cartridge 80. The portions of safety system 18 not mounted within the cartridge may be replaced separately or reused as appropriate. Various exemplary embodiments and implementations of a safety system using a replaceable cartridge are described in more detail in U.S. Provisional Patent Application Ser. No. 60/225,201, filed Aug. 14, 2000, entitled "Replaceable Brake Mechanism For Power Equipment," U.S. Patent application Ser. No. 09/929,236, filed Aug. 13, 2001, entitled "Replaceable Brake Mechanism For Power Equipment," U.S. Provisional Patent Application Ser. No. 60/225,212, filed Aug. 14, 2000, entitled "Brake Positioning System," and U.S. Pat. No. 6,857,345, filed Aug. 13, 2001, entitled "Brake Positioning System," the disclosures of which are herein incorporated by reference.

While one particular implementation of safety system 18 has been described, it will be appreciated that many variations and modifications are possible within the scope of the invention. Many such variations and modifications are described in U.S. Provisional Patent Application Ser. No. 60/182,866, filed Feb. 16, 2000, and U.S. Provisional Patent Application Ser. No. 60/157,340, filed Oct. 1, 1999, the disclosures of which are herein incorporated by reference.

As discussed, safety system 18 includes a brake mechanism 28 that is adapted to stop the cutting tool, thereby preventing or reducing injury to the user. As also discussed previously, brake mechanism may include at least one pawl 60 adapted to engage the cutting tool to stop its rotation. Illustrative examples of suitable pawls are disclosed in copending U.S. Provisional Patent Application Ser. No. 60/225,169, filed Aug. 14, 2000, entitled "Brake Mechanism For Power Equipment," and U.S. Pat. No. 7,024,975, filed Aug. 13, 2001, entitled "Brake Mechanism For Power Equipment," which are incorporated herein by reference. For purposes of the following discussion, cutting tool 14 will be described in the context of a blade 40, such as on a table saw, miter saw, circular saw or the like. It should be understood that blade 40 may include single blades, such as plywood or carbide-tipped blades, or an assembly of several blades, such as a dado blade.

Figure 3:
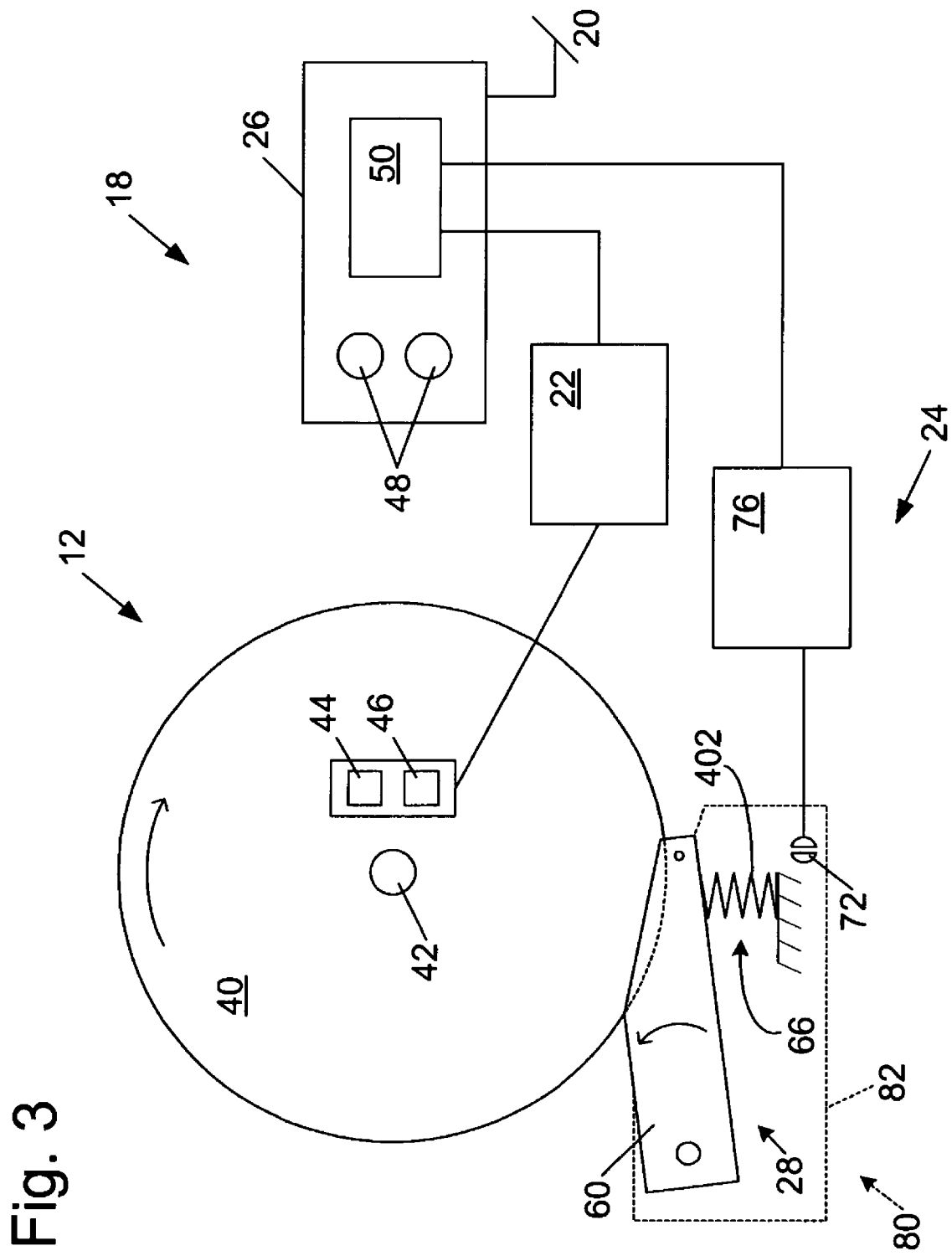
FIG. 3 is a schematic diagram of the safety system of FIG. 2 including another spring-biased brake mechanism according to the present invention.

As further discussed, pawl 60 is urged from its cocked, or restrained, position toward blade 40 or other cutting tool by biasing mechanism 30. In FIG. 2, biasing mechanism 30 includes a spring 66. From its compressed position shown in FIG. 2, spring 66 biases the pawl to move into engagement with blade 40. In FIG. 2, a restraining mechanism 32 is shown restraining pawl 60 from moving toward the blade under the biasing force exerted by spring 66. However, upon release of restraining mechanism 32, the pawl is no longer retained in its cocked position. As such, the pawl moves quickly into engagement with the blade under the force exerted by spring 66, such as shown in FIG. 3. An example of how restraining mechanism 32 may release the pawl is when a sufficiently high current is passed through fusible member 70. Other suitable release and restraining mechanisms are disclosed in copending U.S. Provisional Patent Application Ser. No. 60/225,056, filed Aug. 14, 2000, entitled "Firing Subsystem For Use In A Fast-Acting Safety System," and U.S. Pat. No. 7,100,483, filed Aug. 13, 2001, entitled "Firing Subsystem For Use In A Fast-Acting Safety System," which are incorporated herein by reference.

In FIG. 2, the particular embodiment of spring 66 shown is a coiled compression spring. As used herein, spring 66 will be used to refer to any suitable spring generally, such as any of the particular types of springs discussed herein or other suitable spring mechanisms known in the art. Particular types of springs are referred to herein with particular reference numbers, such as coiled compression spring 402. In FIGS. 2-3 and the subsequent figures, various embodiments of spring-biased brake mechanisms are shown and described and include various elements, subelements and possible variations. It should be understood that spring-biased brake mechanisms according to the present invention may include any one or more of these elements, subelements and variations, regardless of whether those elements, subelements or variations are shown in the same or different figures or descriptions.

The speed at which the pawl will engage and stop the blade is dependent upon the force exerted upon pawl 60 by the spring. Therefore, the more force the spring exerts upon the pawl, the faster the pawl will travel the distance from its restrained position to the blade. In experiments, springs that exert forces in the range of 10 pounds to 500 pounds upon the pawl have proven effective, with springs that exert forces in the range of 50 and 200 pounds being preferred, and a 100-pound force proving particularly effective.

The spring selected should have sufficient force to move the brake pawl into contact with the blade or other cutting tool or portion of operative structure 12 within the desired time frame. It will be understood by those of skill in the art that the appropriate spring force may be calculated from the pawl-to-blade separation, the weight of the pawl, and the desired length of time necessary to move the pawl into contact with the blade (transit time). As discussed in U.S. Provisional Patent Application Ser. No. 60/225,200, filed Aug. 14, 2000, entitled "Contact Detection System For Power Equipment," and U.S. Pat. No. 7,210,383, filed Aug. 13, 2001, entitled "Detection System For Power Equipment," which are incorporated herein by reference, it may be desirable that the brake pawl move into contact with the blade or other cutting tool within approximately one to approximately three milliseconds (ms) after being released from the restraining mechanism. Thus, for a pawl-to-blade separation of 1/32-inch, the selected spring should have sufficient force to accelerate the pawl at over 500 ft/s$^2$ to achieve a transit time of approximately 3-ms, or sufficient force to accelerate the pawl at over 5,000 ft/s$^2$ to achieve a transit time of approximately 1-ms. Similarly, for a pawl-to-blade separation of 1/8-inch, the spring should have sufficient force to generate a pawl acceleration of over 2,000 ft/s$^2$ for a transit time of approximately 3-ms, or a pawl acceleration of over 20,000 ft/s$^2$ for a transit time of approximately 1-ms. Likewise, for a pawl-to-blade separation of 1/4-inch, the spring should have sufficient force to generate a pawl acceleration of over 4,500 ft/s$^2$ for a transit time of approximately 3-ms, or a pawl acceleration of over 40,000 ft/s$^2$ for a transit time of approximately 1-ms.

Once the acceleration has been determined (and ignoring frictional forces), the necessary spring force may be calculated from the acceleration and the weight of the pawl. For example, given a pawl-to-blade separation of 1/32-inch, the 100-lb. spring mentioned above would be sufficient to move a 5-lb. brake pawl into contact with the blade in approximately 3-ms, or a 9-oz. brake pawl in approximately 1-ms. Similarly, given a pawl-to-blade separation of 1/8-inch, the 100-lb. spring would be sufficient to move a 1.4-lb. brake pawl into contact with the blade in approximately 3-ms, or a 2-oz. brake pawl in approximately 1-ms. Likewise, given a pawl-to-blade separation of 1/4-inch, the 100-lb. spring would be sufficient to move an 11-oz. brake pawl into contact with the blade in approximately 3-ms, or a 1-oz. brake pawl in approximately 1-ms. Similar calculations may be performed for the 10-lb., 50-lb., 200-lb., and 500-lb. springs mentioned above, as well as for any other spring force or pawl weight.

However, it should be remembered that the restraining mechanism not only must counteract the force exerted by the spring, but also must be able to quickly release the pawl from its cocked position. Therefore, there may be a tradeoff between increasing the spring force and increasing the complexity, strength and cost of the restraining mechanism to be able to restrain the increase in spring force. Also, any mechanical advantage from the placement and associated structure, if any, coupling the spring to the pawl should be taken into account.

Figure 4:
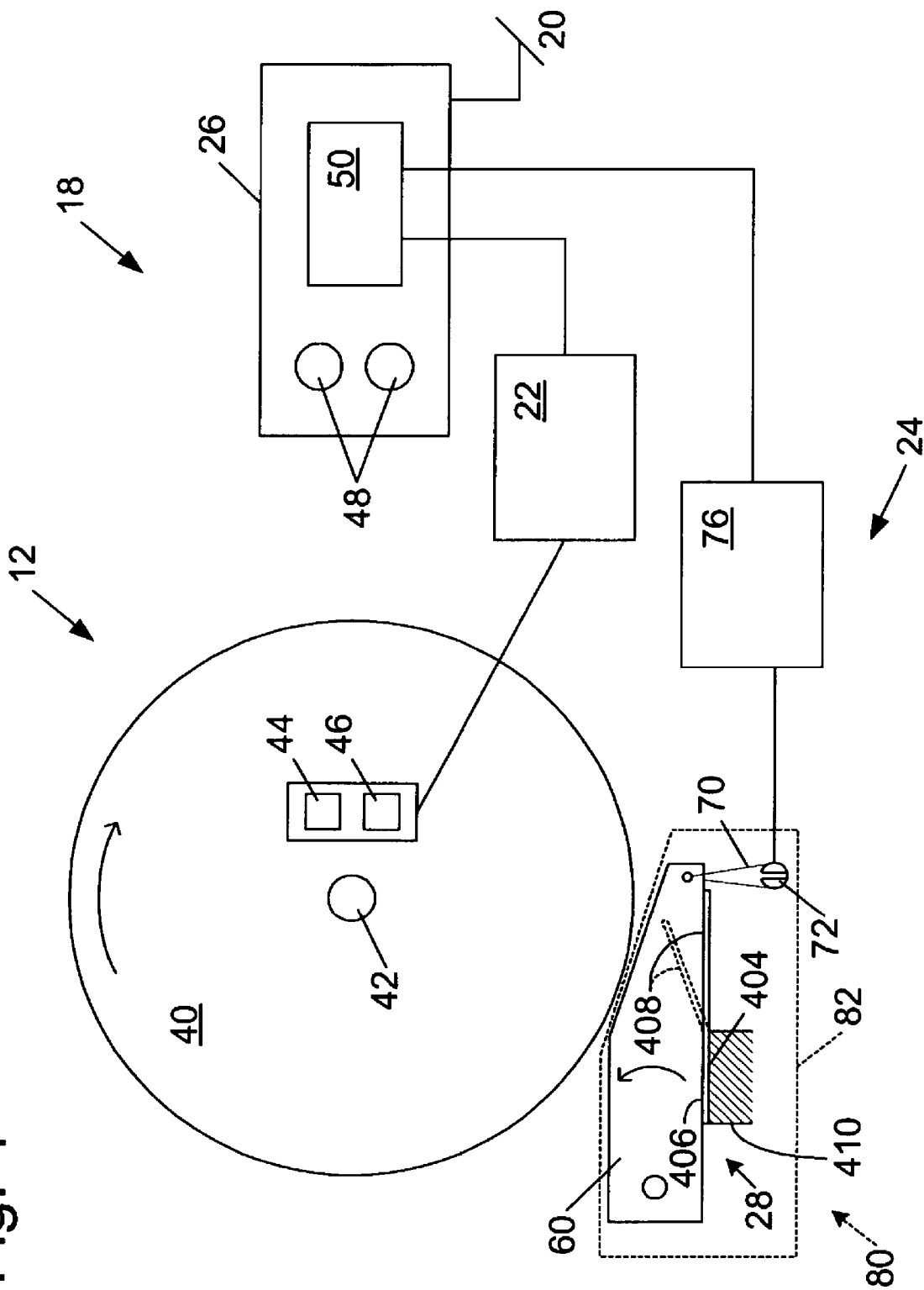
FIG. 4 is a schematic diagram of the safety system of FIG. 2 including another spring-biased brake mechanism according to the present invention.
Figure 5:
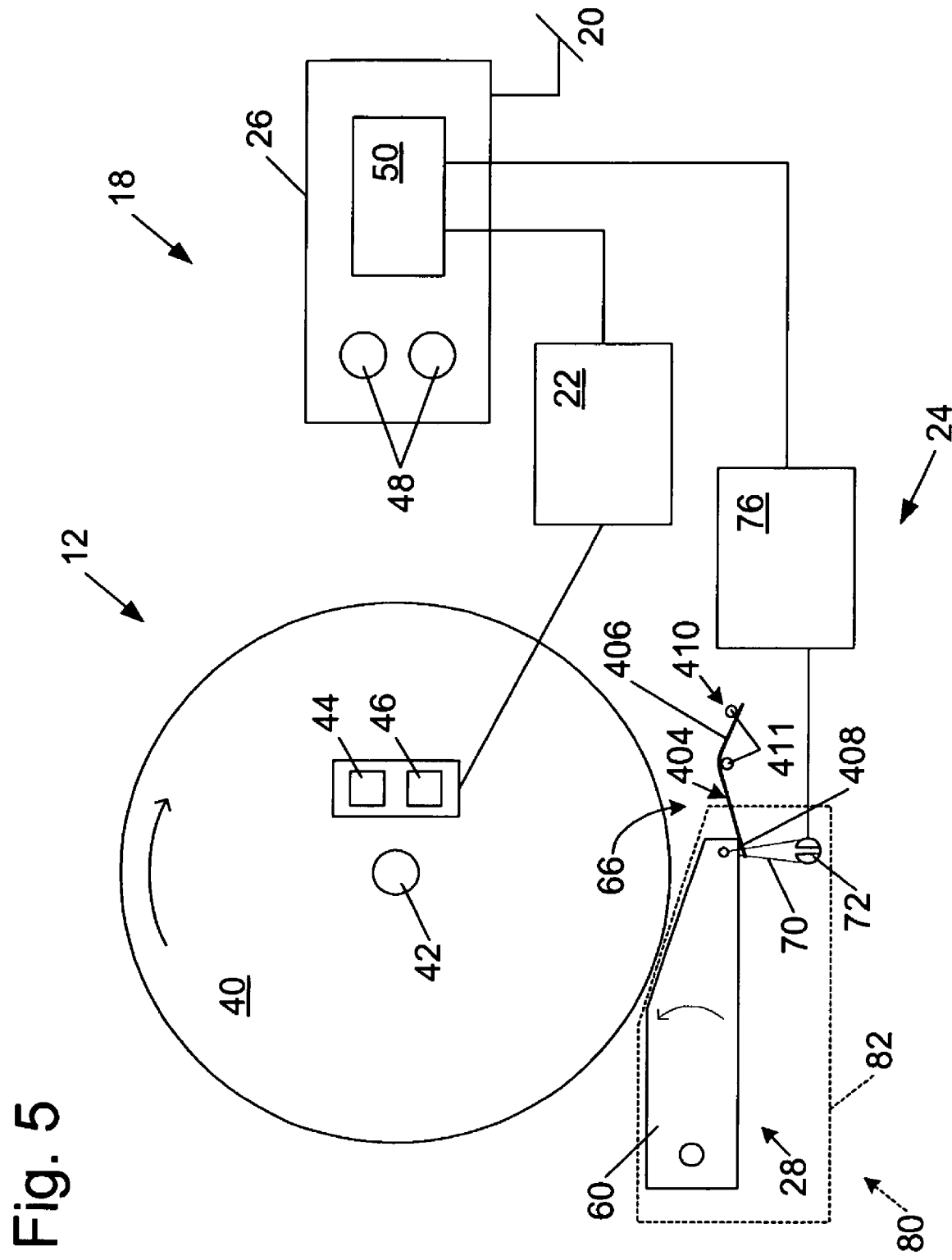
FIG. 5 is a schematic diagram of the safety system of FIG. 2 including another spring-biased brake mechanism according to the present invention.
Figure 6:
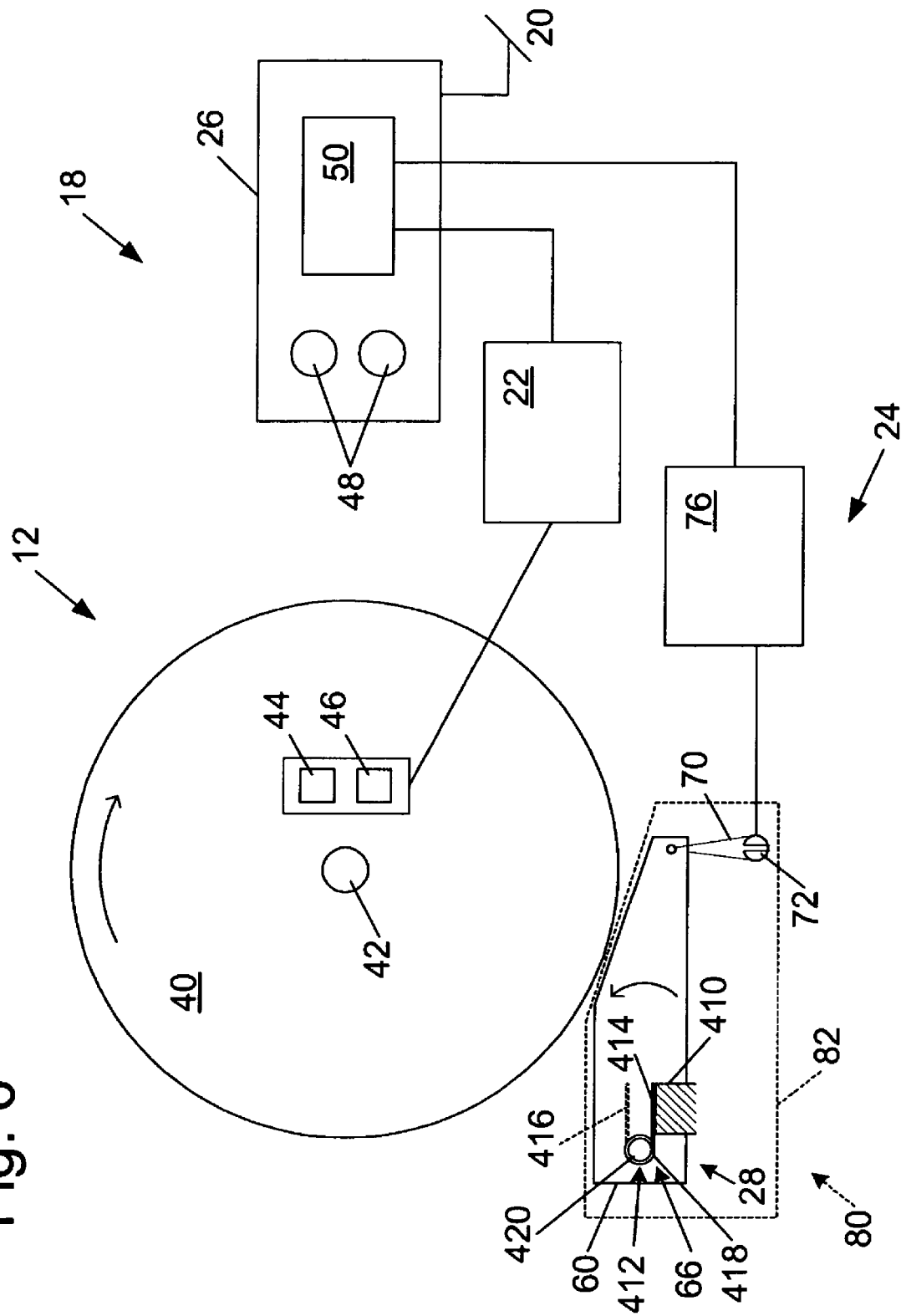
FIG. 6 is a schematic diagram of the safety system of FIG. 2 including another spring-biased brake mechanism according to the present invention.

Brake mechanisms utilizing other springs 66 are shown in FIGS. 4-6. In FIG. 4, spring 66 takes the form of a leaf spring 404, which has base portion 406 and a pawl-engaging portion 408 adapted to engage and urge pawl 60 toward blade 40. Base portion 406 is secured to a suitable mounting assembly 410. Mounting assembly 410 may be any suitable structure that supports the base portion of the leaf spring to bias the pawl-engaging portion 408 toward the pawl. As shown, leaf spring 404 is a cantilevered leaf spring. Another example of a suitable mounting assembly 410 is shown in FIG. 5, in which the mounting assembly includes a plurality of spaced-apart supports 411.

In FIG. 6, a torsion spring 412 is utilized to bias pawl 60 into engagement with blade 40. Spring 412 includes a fixed end 414, a biasing end 416 adapted to engage pawl 60, and a coiled portion 418 intermediate the ends. As shown, torsion spring 412 is mounted on the same pin or axle 420 that pawl 60 is mounted upon. It is within the scope of the invention that spring 412 may be interposed between the axle and the pawl, mounted on the axle adjacent or spaced-apart from the pawl, or mounted on structure other than axle 420.

Figure 7:
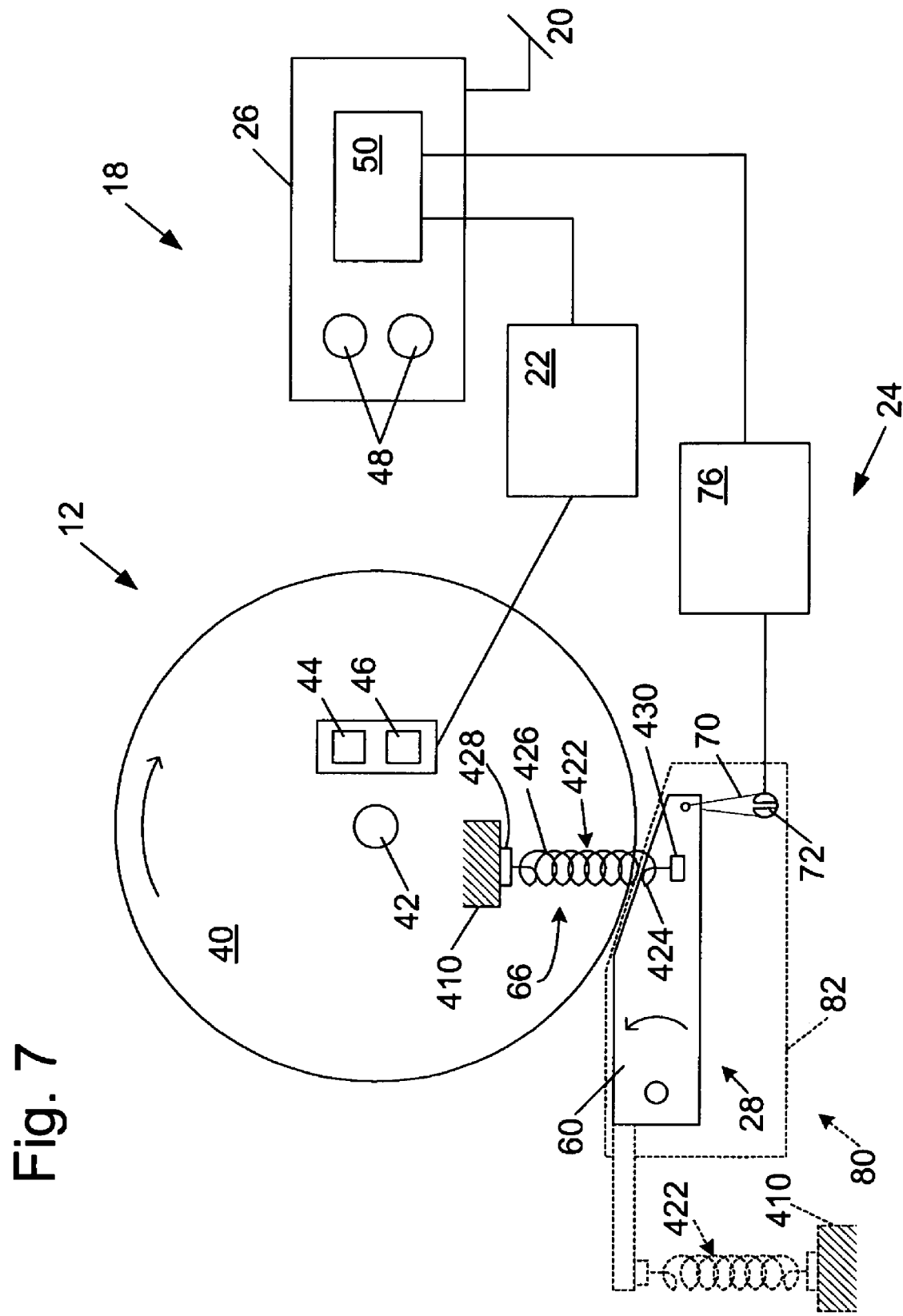
FIG. 7 is a schematic diagram of the safety system of FIG. 2 including another spring-biased brake mechanism according to the present invention.

In FIG. 7, an extension spring 422 is shown. Unlike a compression spring that resists compressive forces, extension spring 422 resists being elongated from its resting, or zero load, position. Therefore, instead of pushing or urging pawl 60 toward the blade by pushing upon the pawl, extension spring 422 pulls the pawl toward the blade or other cutting tool. As shown, extension spring 422 includes a biasing end portion 424 coupled to the pawl and a fixed end portion 426 coupled to a suitable mounting assembly 410 disposed generally toward the blade relative to the biasing end portion. The mounting assembly to which fixed end portion 426 is coupled may include a linkage, or mount, 428 that couples the end portion to the mounting assembly. Similarly, biased end portion 426 may be coupled to the pawl or other structure that moves with the pawl by a linkage or mount 430. Mounting assembly 410 may include any suitable structure able to support fixed end portion 426 without interfering with the operation of machine 10. For example, it may be mounted adjacent blade 40, coupled to the blade's arbor, mounted on structure that moves with the blade as the blade is tilted, raised or lowered, etc. Alternatively, extension spring 422 may act upon a portion of the pawl, or linkage coupled thereto, that is on the other end of the pawl's pivot axis than the blade-engaging portion of the pawl. This configuration is illustrated in dashed lines in FIG. 7. This configuration may be preferred because mounting assembly 410 is spaced further away from the blade, and may be more easily positioned.

Figure 8:
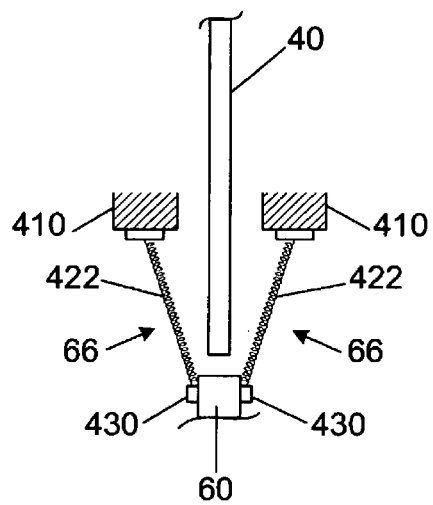
FIG. 8 is a fragmentary top plan view of another spring-biased brake mechanism according to the present invention.

Although a single spring 66 is shown in FIGS. 2-7, it should be understood that brake mechanism 28 may include more than one spring. For example, in the illustrative embodiment shown in FIG. 7, a pair of extension springs 422 may be used, such as shown in FIG. 8. When two or more springs are used, they may be of similar or different types and strengths.

In FIGS. 2-8, springs 66 are shown directly engaging pawls 60. It should be understood that the springs may alternatively engage other structure in communication with pawl 60. For example, springs 66 may engage one or more linkages through which the spring's biasing force is passed to the pawl. In such a configuration, restraining mechanism 32 may restrain any suitable portion of the biasing mechanism and pawl assembly to prevent the pawl from being moved into engagement with the blade or other cutting tool. For example, in the context of a restraining mechanism that includes a fusible member 70, the fusible member may be coupled to pawl 60, spring 66, or the one or more linkages interconnecting the spring and pawl.

Figure 9:
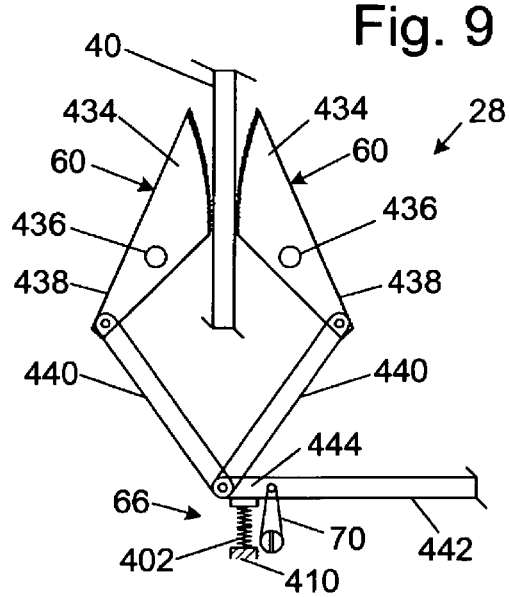
FIG. 9 is a fragmentary top plan view of another spring-biased brake mechanism according to the present invention.

An example of a brake mechanism 28 in which spring 66 directly engages a linkage instead of pawl 60 is shown in FIG. 9 in the context of a brake mechanism having a pair of pawls 60 adapted to engage a blade 40. As shown, pawls 60 include blade-engaging portions 434 adapted to engage blade 40. Pawls 60 are pivotal about axles or pins 436 and include distal portions 438 to which linkages 440 are coupled. Linkages 440 are further coupled to a spring-engaging linkage 442, which as shown, includes an end 444 adapted to be moved toward blade 40, thereby drawing the blade-engaging portions of the pawls into contact with the blade. In FIG. 9, a compression spring 402 is shown engaging linkage 442, however, any of the springs described herein could be used.

Springs 66 may also exert a biasing force upon an engagement mechanism instead of pawl 60. In such an embodiment, the force of the spring is not applied to the pawl unless restraining mechanism 32 releases the engagement mechanism or biasing mechanism to urge the pawl into engagement with the blade or cutting tool of machine 10. An advantage of such a brake mechanism is that the biasing mechanism is not exerting force upon the pawl until the pawl is urged into contact with blade 40. This may, but does not necessarily, enable pawl 60 to be selectively removed and replaced from the brake mechanism without disabling biasing mechanism 30.

Additionally, or alternatively, biasing mechanism 30 may be self-contained as a module or cartridge that can be selectively removed and replaced from the rest of the brake mechanism when the fusible member or other portion of restraining mechanism 32 that counteracts the force of spring 66 is secured between portions of this module.

Figure 10:
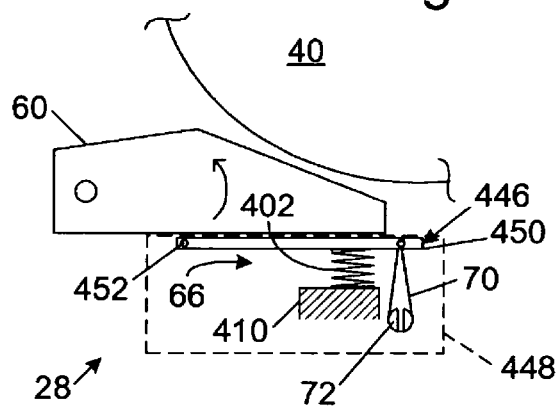
FIG. 10 is a fragmentary side elevation view of another spring-biased brake mechanism according to the present invention.

An example of a brake mechanism with an engagement mechanism is shown in FIG. 10. As shown, spring 66 acts upon engagement mechanism 446, which is depicted to include a pivotal plate 450. Plate 450 selectively prevents the spring's biasing force from being exerted upon pawl 60. As shown, a restraining mechanism, such as fusible member 70, prevents plate 450 from pivoting about its axle 452 under the biasing force of spring 66. As a result, the pawl is not urged toward the blade. A module or cartridge 448 is shown schematically in dashed lines, and is a possible rather than necessary element of brake mechanism 28. Module 448 typically will be mounted upon a suitable support or receiver in the machine, and may also include a connection with a suitable mechanism for releasing restraining mechanism 32. For example, contact mount 72 may be electrically connected to a portion of the release mechanism that does not form part of the replaceable module.

Figure 11:
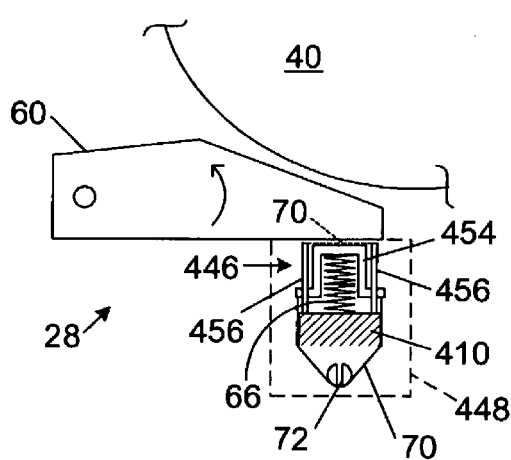
FIG. 11 is a fragmentary side elevation view of another spring-biased brake mechanism according to the present invention.
Figure 12:
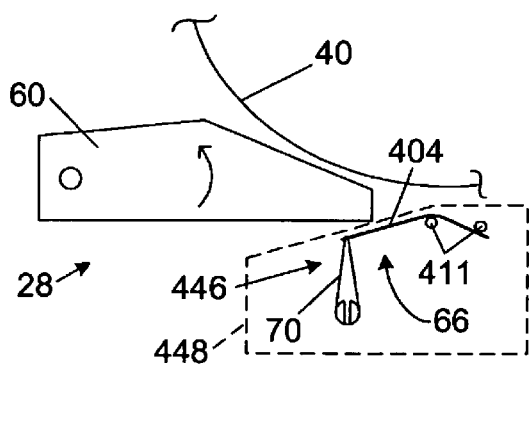
FIG. 12 is a fragmentary side elevation view of another spring-biased brake mechanism according to the present invention.

A variation of this brake mechanism is shown in FIG. 11, in which engagement mechanism 446 takes the form of a slidable member 454 that is adapted to translate, or slide, along tracks 456 toward and away from blade 40. As shown, fusible member 70 restrains the slidable member 454 from moving toward the blade, thereby preventing the spring from urging pawl 60 into contact with blade 40. Also shown in FIG. 11, is a variation of this brake mechanism, in which fusible member 70 extends across the travel path of slidable member 454 to prevent member 454 from moving under the force exerted by spring 66. In fact, fusible member 70 may itself form engagement mechanism 446, such as shown in FIG. 12, where the fusible member extends across the path of spring 66, thereby preventing the spring from urging pawl 60 into the blade or other cutting tool.

The brake mechanisms shown in FIGS. 9-11 may also be understood as including biasing mechanisms 30 with compound release mechanisms because there is more than one step for the brake mechanism to be actuated and pawl 60 to engage the blade or other cutting tool. Unlike the brake mechanisms shown in FIGS. 3-8, in which the release of restraining mechanism 32 was all that was required for spring 66 to urge pawl 60 into the blade or other cutting tool, the brake mechanisms shown in FIGS. 9-11 utilize a compound release to engage blade 40 with pawl 60. For example, the release of restraining mechanism 32 may free a portion of biasing mechanism 30 to move, such as to engage engagement mechanism 446 or a linkage, which in turn transfers this force to pawl 60.

Figure 13:
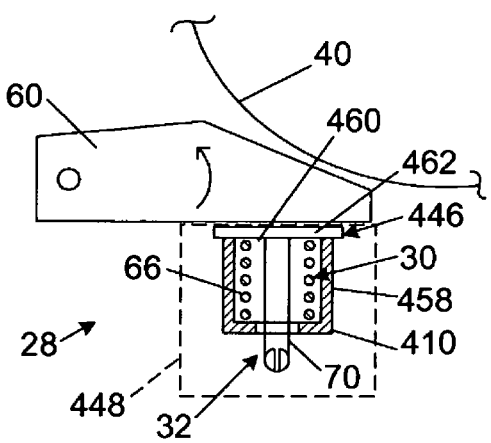
FIG. 13 is a fragmentary side elevation view of another spring-biased brake mechanism according to the present invention.

In FIG. 13, another example of a brake mechanism 28 with a compound release, or compound release mechanism, is shown in the form of a self-contained actuator assembly. As shown, spring 66 is housed in a shell 458 with an open end 460 through which the spring, or a suitable linkage coupled to the spring, may extend upon release of restraining mechanism 32. In the illustrative embodiment shown in FIG. 13, end 460 is at least partially covered by a spanning member 462 positioned between the spring and pawl 60. Member 462 does not need to completely close end 460, however, it should prevent spring 60 from passing through end 460 and engaging pawl 60. Fusible member 70, or another suitable embodiment of restraining mechanism 32, is coupled to member 462 and prevents spring 66 from urging the spanning member into contact with pawl 60. As shown, member 70 passes through shell 458, and in the illustrated embodiment, spring 66. It should be understood that shell 458 may be used with embodiments of brake mechanism 28 that do not include a compound release, in which case pawl 60 would typically abut the open end of the shell.

Figure 14:
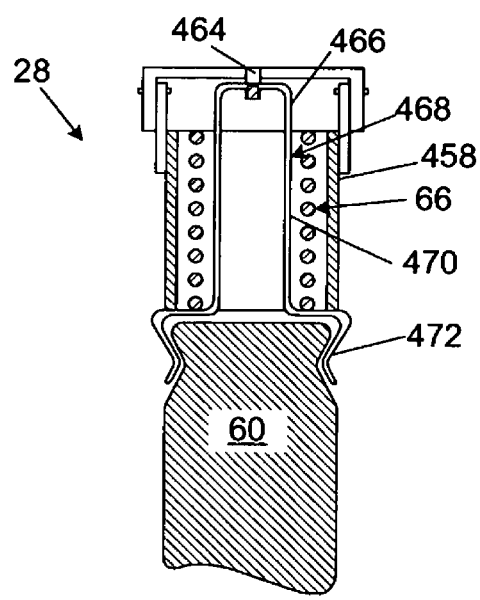
FIG. 14 is a cross-sectional side elevation view of another spring-biased brake mechanism according to the present invention.
Figure 15:
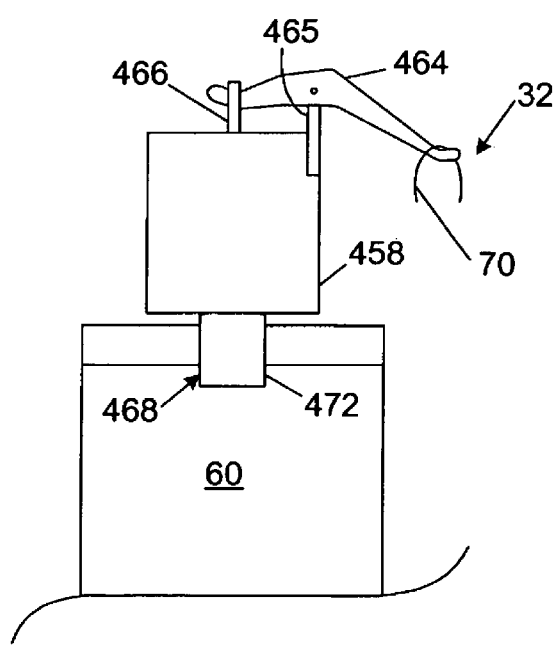
FIG. 15 is an end elevation view of the brake mechanism of FIG. 14.

Other exemplary embodiments of self-contained actuator assemblies are shown in FIGS. 14 and 15, where restraining mechanism 32 is releasably coupled to a lever arm 464 that in turn is coupled to an end portion 466 of a carrier 468. Lever, or pivot, arm 464 pivots about a pivot axis defined by a projecting portion 465 on shell 458. It should be remembered that arm 464, carrier 468 and shell 458 (including portion 465) must be sufficiently strong to withstand the force of spring 66. End portion 466 of carrier 468 should be mounted on arm 464 so that it will release relatively immediately upon release of restraining mechanism 32 and initial pivoting of arm 464 about portion 465. Alternatively, arm 464 should be able to pivot without obstruction until pawl 60 is fully engaged with blade 40 so that the pivot arm does not impede the motion of pawl 60, and thereby increase the time required to stop blade 40. In such a configuration where arm 464 pivots without restricting the motion of the pawl, arm 464 does not need to release from carrier 468, and instead these portions may remain coupled together.

Carrier 468 includes an elongate support 470 that extends through shell 458 and further includes a pawl-receiving portion 472 that is adapted to releasably receive pawl 60, thereby allowing the pawl to be selectively removed and replaced without dismantling or otherwise disassembling the rest of brake mechanism 28. As shown, pawl-receiving portion 472 also forms a spanning member in that it prevents the spring from urging the pawl into engagement with blade 40. In FIGS. 14 and 15, portion 472 and pawl 60 are shown having complimentary configurations so that the pawl may be coupled to the pawl-receiving portion without requiring additional securing mechanisms. In the embodiment shown, the pawl may be either slid onto portion 472 from an end, or alternatively by briefly deflecting portion 472 outwardly as the pawl is inserted into its mounted position. It will be appreciated, however, that additional securing mechanisms may be used, such as screws, pins, and other releasable fasteners. Because neither spring 66 nor fusible member 70 acts directly upon the pawl or pawl-receiving portion, the coupling between these portions does not have to be strong. As a further variation, pawl 60 may be fixedly secured to, or even integrally formed with, carrier 468, or at least the pawl-engaging portion thereof.

Figure 16:
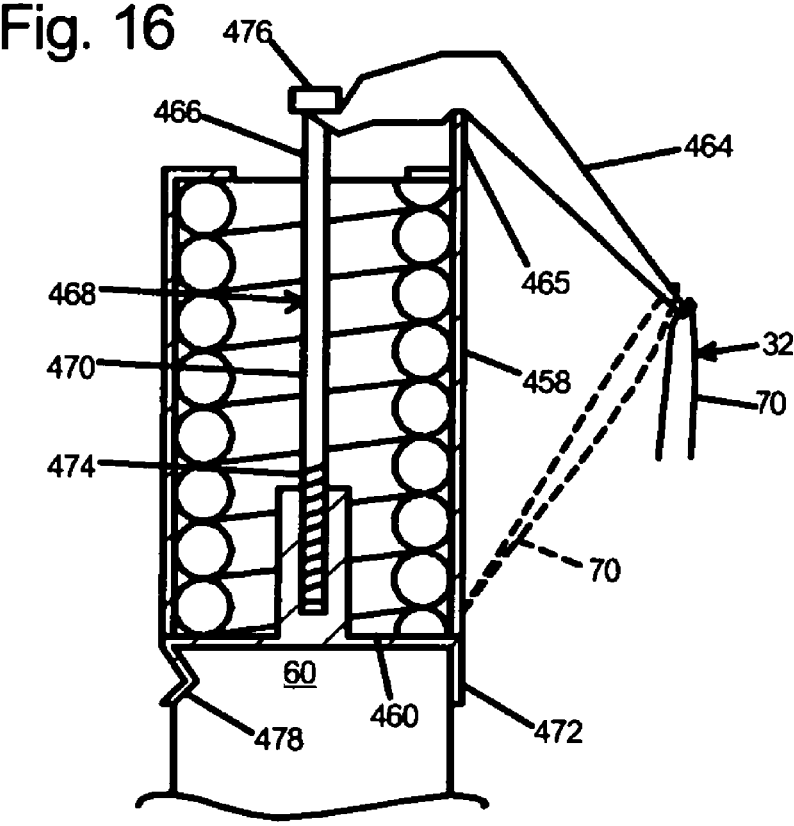
FIG. 16 is a cross-sectional side elevation view of another spring-biased brake mechanism according to the present invention.

A variation of a self-contained actuator is shown in FIG. 16, in which the length of carrier 468 is selectively adjustable, thereby allowing the relative positioning of the pawl relative to blade 40 to also be adjustable. As shown, support 470 includes a threaded portion 474 that is threadingly received into pawl-receiving portion 472. The length of carrier 468 may be adjusted by rotating support 470, such as via a user-manipulable portion 476, to increase or decrease the extent to which portion 474 is received into pawl-receiving portion 472. In FIG. 16, pawl-receiving portion 472 is also shown including key structure 478 that prevents pawl 60 from being installed into the pawl-receiving portion other than in a position defined by key structure 478.

Figure 17:
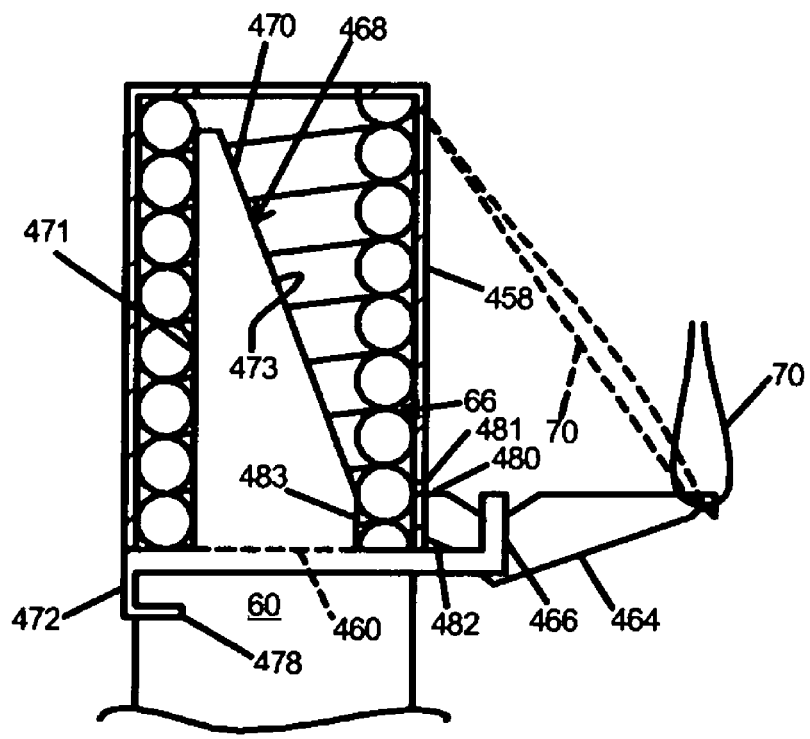
FIG. 17 is a cross-sectional side elevation view of another spring-biased brake mechanism according to the present invention.

Another embodiment of a spring-biased brake mechanism is shown in FIG. 17. As shown, lever arm 464 includes an end portion 480 that couples to shell 458 proximate open end 460. In the embodiment shown, end portion 480 is received into a notch 481 in the shell, and includes a shoulder 482 about which the arm pivots upon release of restraining mechanism 32. Alternatively, shell 458 may include a ledge or projection upon which arm 464 is seated. Preferably, at least an end region 483 of elongate support 470 generally conforms to the inner diameter of spring 66 to resist shifting or tilting of the carrier when in the restrained position shown in FIG. 17.

As shown, support 470 includes an edge 471 that extends generally parallel and against spring 66, with a generally opposed edge 473 tapering from pawl-receiving portion 472 toward end portion 466. Also shown in FIG. 17 is another example of a pawl-receiving portion 472 with a key structure 478. Edge 471 is on the side of support 470 distal pivot arm 464 to stabilize the carrier during installation and while in the restrained position. Edge 473 is on the side of support 470 proximate lever arm 464 to allow the support to tilt as it is urged from shell 458 upon release of restraining mechanism 32. This configuration of carrier 468 is an example of a carrier that may be integrally formed, or monolithic, with pawl 60.

In the brake mechanisms shown in FIGS. 14-17, the portion of fusible member 70 not coupled to pivot arm 464 may be secured to any suitable supporting structure to allow the fusible member to counteract the force of spring 66. This supporting structure may form part of the brake mechanism shown in FIGS. 14-17, such as securing the fusible member to shell 458 or pawl-receiving portion 472. In such a configuration, the portions of the brake, biasing and restraining mechanisms shown in FIGS. 14-17 form a self-contained module or self-contained actuator.

Figure 18:
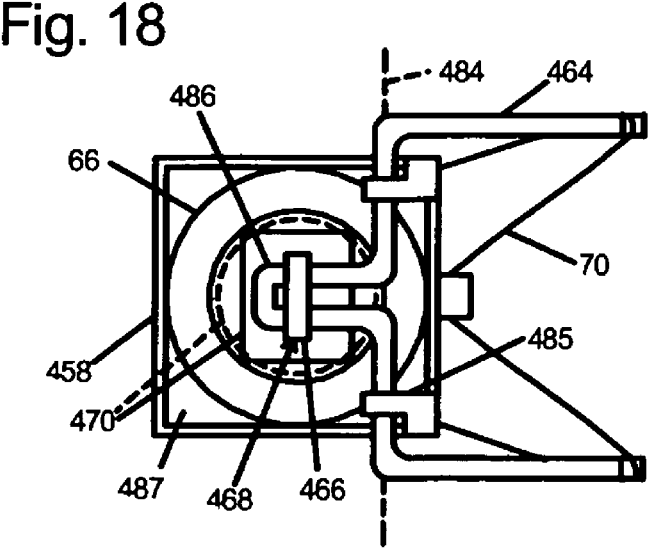
FIG. 18 is a top plan view of another spring-biased brake mechanism according to the present invention.

In FIG. 18, an embodiment of a shell and pivot arm assembly is shown in which the distance between the pivot axis 484 of arm 464 and the region upon which arm 464 supports carrier 468 is reduced from the embodiments shown in FIGS. 14-16. As shown, arm 464 is pivotally coupled to shell 458 by a pair of mounts 485 and includes a carrier-receiving portion 486. In the embodiment shown in FIG. 18, arm 464 may have a generally planar configuration that allows the arm to extend against a portion of the shell's end 487. Upon release of the restraining mechanism, arm 464 pivots relative to shell 458 and portion 486 pivots into the shell and releases the carrier to move under the force of spring 66. As shown, end 487 of shell 484 is sufficiently open to permit portion 486 to pivot into the shell and release carrier 468. As shown, end 487 is also sufficiently obstructed to prevent spring 66 from passing therethrough. Also illustrated in FIG. 18 is an embodiment of support 470 that generally conforms to the inner dimension of spring 66, thereby supporting carrier 468 against axial tilting within the shell as the carrier passes through the shell. Another suitable configuration for support 470 is shown in dashed lines in FIG. 18.

Figure 20:
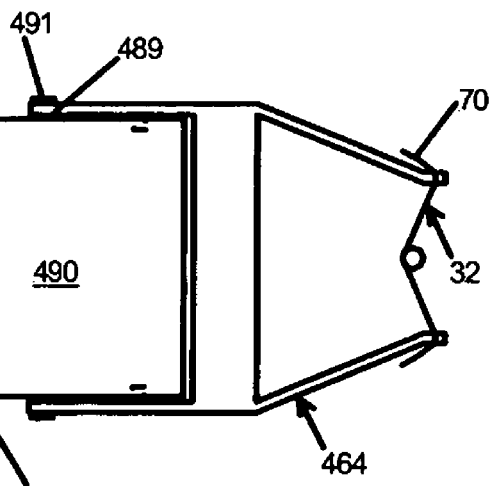
FIG. 20 is a bottom plan view of the brake mechanism of FIG. 19.
Figure 19:
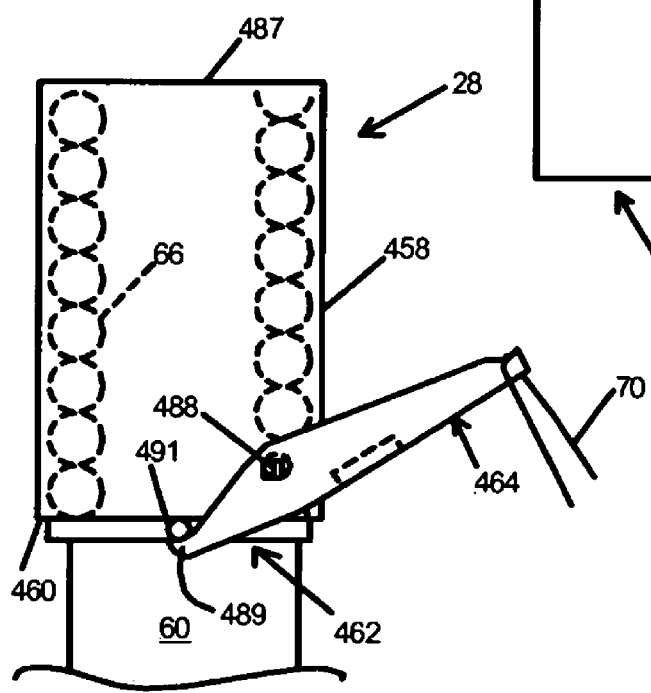
FIG. 19 is a side elevation view of another spring-biased brake mechanism according to the present invention.

In FIGS. 19 and 20, another example of a spring-biased brake mechanism with a lever arm 464 that releases from open end 460 of shell 458 is shown. As shown, arm 464 is pivotally coupled to shell 458 by pins 488 and includes a pair of catches 489 that engage a spanning member 462. As shown, spanning member 462 includes a cover 490 that covers open end 460 of shell 458 and includes projections 491 that are engaged by catches 489. Alternatively, spanning member 462 may include any other suitable configuration sufficient to prevent spring 66 from passing through, or urging another member through, end 460 prior to release of restraining mechanism 32. Preferably, catches 489 are shaped to release spanning member 462 as arm 464 begins to pivot upon release of restraining mechanism 32.

Figure 21:
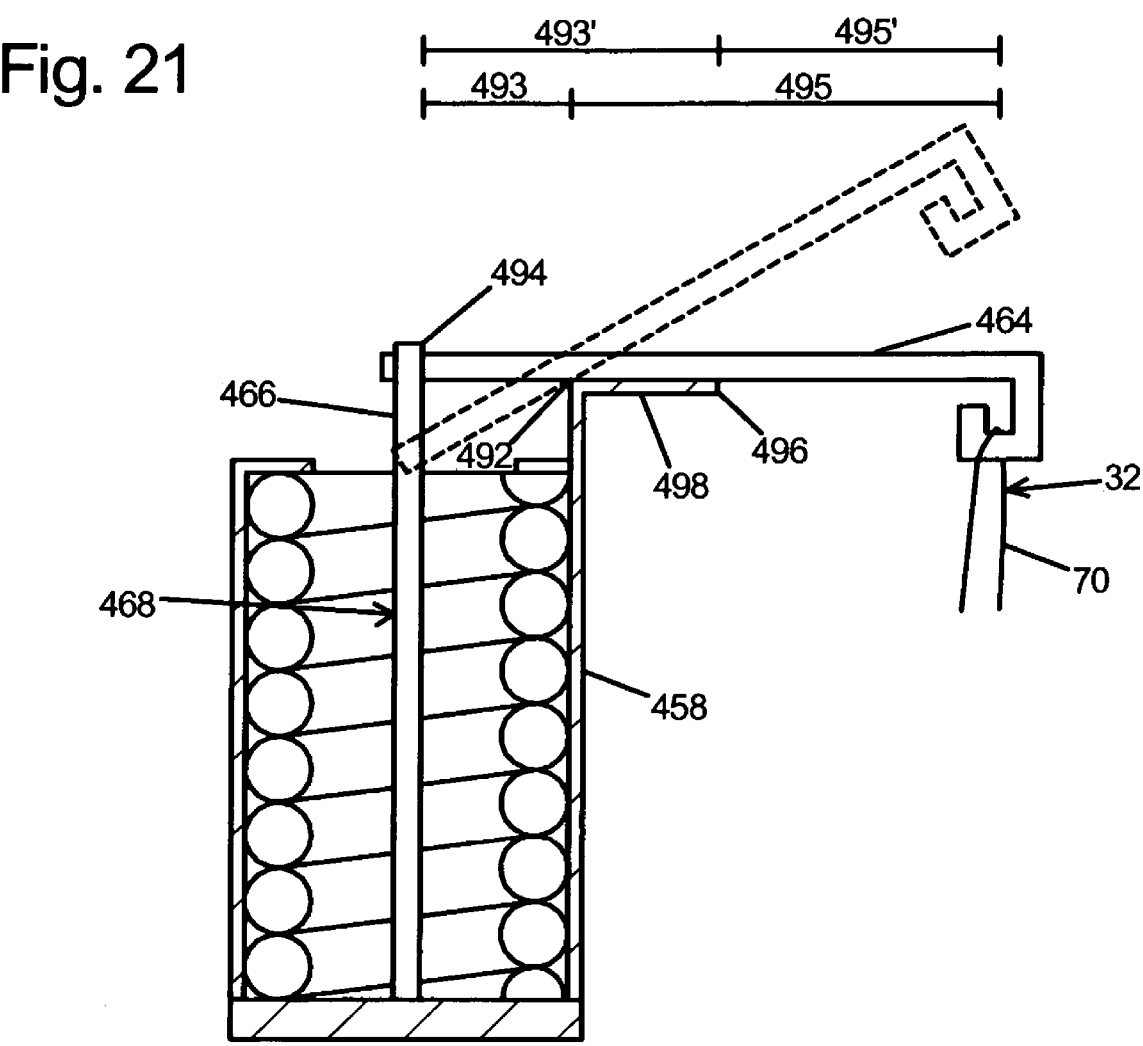
FIG. 21 is a side elevation view of another spring-biased brake mechanism according to the present invention.

In FIG. 21, another example of a spring-biased brake mechanism is shown. As shown, lever arm 464 and shell 458 are adapted to facilitate more uniform positioning of carrier 468, and thereby pawl 60, as arm 464 is secured in a cocked, or restrained, position by restraining mechanism 32, such as fusible member 70. Prior to attachment of fusible member 70, lever arm 464 is pivoted about edge 492 of shell 458 as the arm is pivoted to the position shown in solid lines in FIG. 21. In this interval, there is a mechanical advantage achieved because the distance 493 between edge 492 and the proximate edge 494 of carrier 468 is much less than the distance 495 between edge 492 and fusible member 70. However, to continue pivoting arm 464 downward, this mechanical advantage is lost because the fulcrum about which the arm is pivoted changes, as reflected by distances 493' and 495'. As shown, arm 464 now pivots about the edge 496 of extension 498. The corresponding amount of force required to pivot arm 464 may be used as an indicator of when arm 464 is positioned properly, at which point fusible member 70 may be attached. Of course, if fusible member 70 is a preformed member of fixed length, then precise positioning of the lever arm 464 and pawl 60 are achieved simply by the attachment of the fusible member.

It will be appreciated that the spring-biased brake mechanism described above may be implemented with many variations within the scope of the invention. For example, the spring-biased mechanisms disclosed herein may be used to drive the retraction of blade 40, such as on a table saw or a miter saw, such as described in copending U.S. Provisional Patent Application Ser. No. 60/225,089, filed Aug. 14, 2000, entitled "Retraction System For Use In Power Equipment," U.S. patent application Ser. No. 09/929,242, filed Aug. 13, 2001, entitled "Retraction System For Use In Power Equipment," U.S. Provisional Patent Application Ser. No. 60/225,057, filed Aug. 14, 2000, entitled "Miter Saw With Improved Safety System," and U.S. patent application Ser. No. 09/929,238, filed Aug. 13, 2001, entitled "Miter Saw With Improved Safety System," which are incorporated herein by reference.

Figure 23:
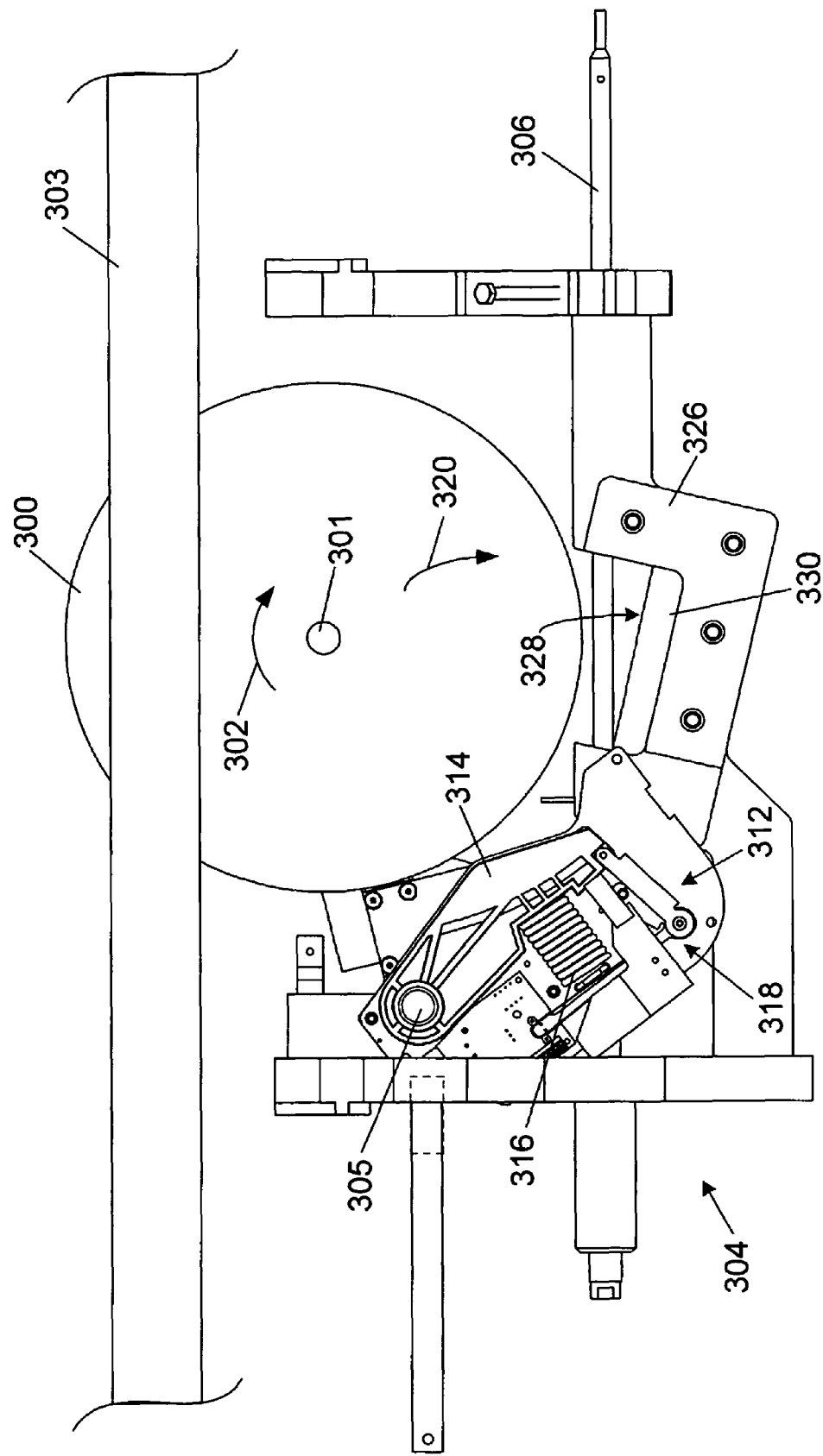
FIG. 23 is a schematic side view of a table saw with a retraction system.
Figure 24:
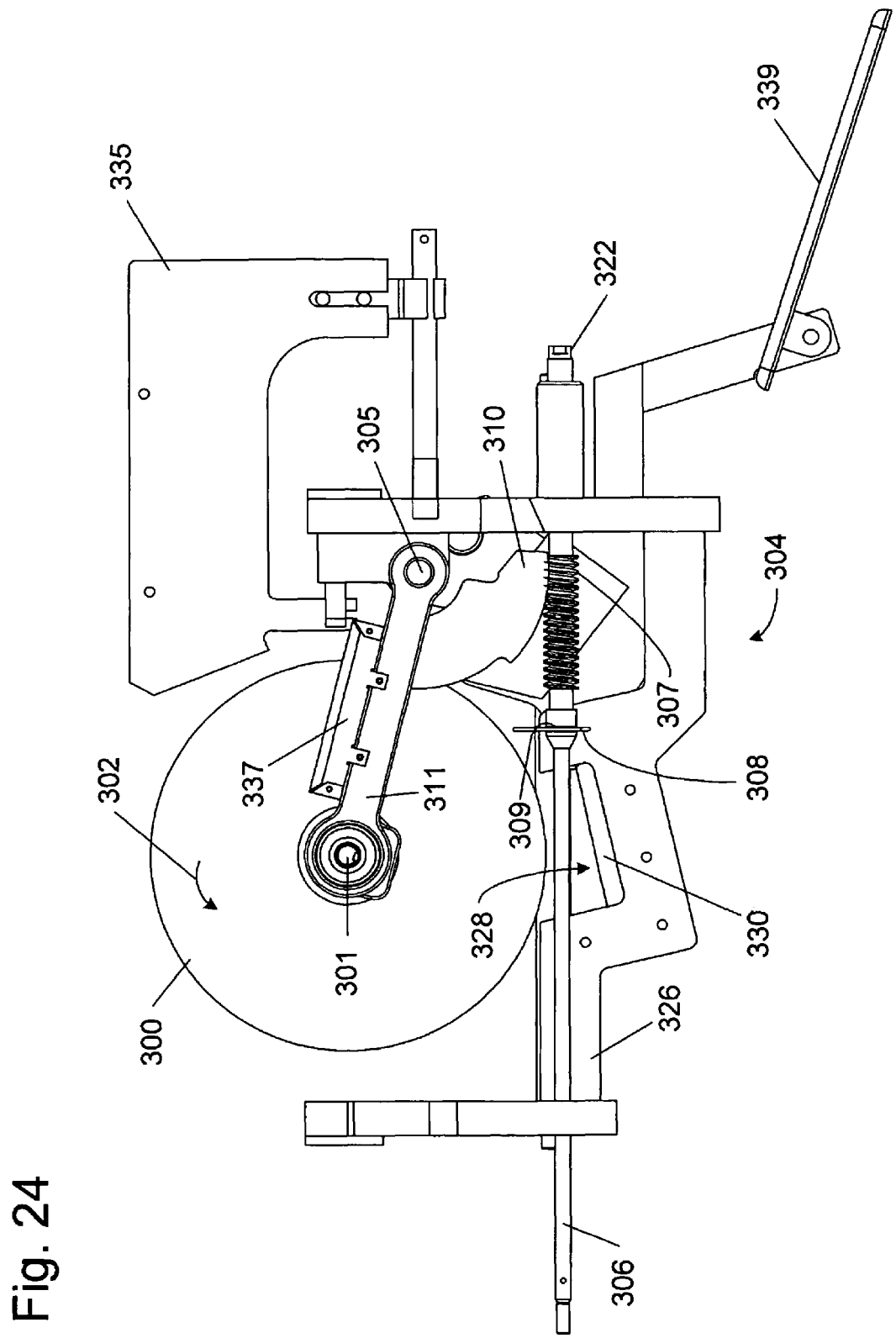
FIG. 24 is a schematic side view of a second side of a table saw with a retraction system.

FIGS. 23 and 24 show side views of a table saw configured with both a retraction system and a braking mechanism. A blade 300 is mounted on an arbor 301 to spin in the direction of arrow 302. A table 303 (not shown in FIG. 24), which defines the work surface or cutting region for the table saw, is adjacent the blade and the blade extends above the table. A support structure 304 may support blade 300 and arbor 301 in any known way, or as described in more detail in U.S. Provisional Patent Application Ser. No. 60/225,058, titled "Table Saw with Improved Safety System," filed Aug. 14, 2000.

Blade 300 is configured to pivot up and down so that a user can position the blade to extend above the table as needed. The blade pivots around a pin 305. A user may pivot the blade to adjust its position by turning a shaft 306 on which a worm gear 307 is mounted. The worm gear is mounted on the shaft so that it turns with the shaft, but so that it may slide on the shaft when necessary, as explained below. Worm gear 307 is mounted on shaft 306 like a collar, with the shaft extending through a longitudinal hole in the worm gear. The worm gear is held in place during normal operation of the saw by a spring clip 308, which is positioned in a groove or channel 309 on the worm gear and which also engages a detent or shoulder on shaft 306 to hold the worm gear in place. The worm gear engages an arcuate rack 310 that supports an arbor block 311, which in turn supports arbor 301 and blade 300. Thus, when a user turns shaft 306, such as by turning a knob attached to the shaft (not shown), worm gear 307 moves arbor block 311 and the blade up or down, depending on the direction that the worm gear is turned.

A brake cartridge 312 is mounted in the saw adjacent blade 300. The brake cartridge includes a pawl 314 biased toward blade 300 by a spring 316. The pawl is held away from blade 300 by a release mechanism 318, as described generally above and as described in more detail in U.S. Provisional Patent Application Ser. No. 60/225,170, entitled "Spring-Biased Brake Mechanism for Power Equipment," U.S. Provisional Patent Application Ser. No. 60/225,169, entitled "Brake Mechanism for Power Equipment," U.S. Provisional Patent Application Ser. No. 60/225,201, entitled "Replaceable Brake Mechanism for Power Equipment," and U.S. Provisional Patent Application Ser. No. 60/225,212, entitled "Brake Positioning System," all filed Aug. 14, 2000. The cartridge is configured so that the release mechanism releases the pawl into the blade upon the receipt of a detection signal, as explained generally above and as explained in more detail in U.S. Provisional Patent Application Ser. No. 60/225,056, titled "Firing Subsystem for use in a Fast-Acting Safety System," filed Aug. 14, 2000.

Brake cartridge 312 is positioned on the blade's pivot axis so that pawl 314 can move around pin 305. Thus, when pawl 314 hits the blade, the angular momentum of the blade is transferred to the arbor block, and the blade, arbor block, rack and cartridge try to retract or move down in the direction of arrow 320. Alternatively, the cartridge may be positioned on a pin different from pin 305, but that still pivots with the blade.

The blade will move down to the extent permitted by the contact between rack 310 and worm gear 307. If the worm gear is fixed in place, the downward movement of the blade may strip teeth on the rack and/or worm gear, and may prevent the blade from moving down as far as desired. In the embodiment shown in FIGS. 23 and 24, the worm gear is adapted to snap free and move on shaft 306 when the pawl hits the blade.

When the pawl hits the blade, the resultant angular momentum impulse causes spring clip 308 to snap loose, allowing the worm gear to slide down the shaft toward an end 322 of the shaft. The spring clip snaps loose because the rack moves down when the blade is stopped, and the rack contacts the worm gear and forces the worm gear to move. The force of the rack against the worm gear causes the spring clip to snap loose. The worm gear is put back in place by moving it back along shaft 306 until the spring clip snaps into place on the shaft.

The table saw shown in FIGS. 23 and 24 also includes a support 326 configured with a seat or region 328 in which is placed an impact-absorbing material 330. The support is positioned under the arbor and arbor block so that when the blade retracts, the arbor block strikes impact-absorbing material 330. Support 326 and impact absorbing material 330 act as a barrier to stop the downward movement of the blade. The support is positioned so that blade 300 may retract a sufficient distance. The impact-absorbing material can be any one of a number of cushioning materials, such as rubber, dense foam, plastic, etc. One material found to be suitable is available under the part number C-1002-06 from AearoEAR, of Indianapolis, Ind. Alternatively, impact-absorbing material 330 may be attached to the undersurface of the arbor block instead of on support 326. Additionally, support 326 may take many forms. In fact, shaft 306 may be configured and positioned so that it provides a surface to stop the downward movement of the blade.

FIG. 24 also shows a splitter 335 that extends above table 303 behind blade 300 to prevent kickback. A blade guard may also substantially enclose blade 300. FIG. 24 further shows a housing 337 for electronic components relating to the safety system, and a motor mount 339, which are not shown in FIG. 23.

In the construction described above, the angular momentum of the blade causes the blade, arbor block and cartridge to all pivot down away from the cutting region when the pawl strikes the blade. Thus, the angular momentum of the blade causes the retraction. Blade 300 is permitted to move downward a sufficient distance so that the blade is completely retracted. In independent experiments, the safety system depicted in FIGS. 23 and 24 and described above has been shown to retract the blade completely below table 303 within approximately 14 milliseconds after contact is detected. Indeed the downward motion of the blade during retraction is too fast to detect with the human eye, i.e., the blade disappears below table 303 with no discernable transition or downward motion. The ability of the blade to retract minimizes any injury from accidental contact with the blade.

Figure 25:
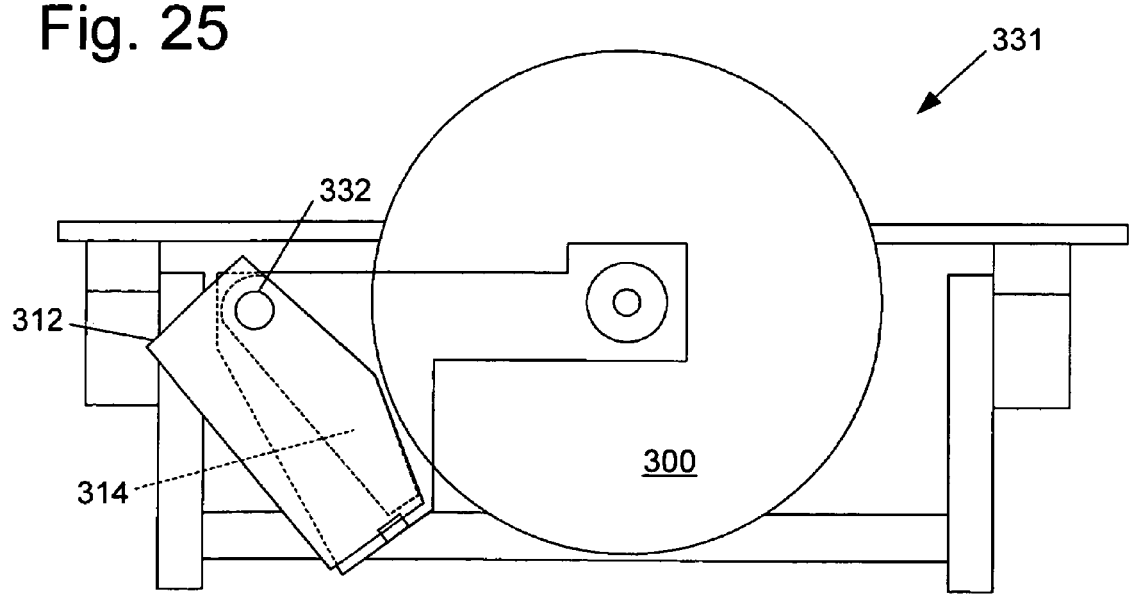
FIG. 25 is a schematic, side view of a saw with another embodiment of a retraction system.

FIG. 25 shows another embodiment of a retraction system used with a brake pawl. A saw 331 includes a blade 300 and a brake cartridge 312 housing a brake pawl 314. The cartridge and pawl are mounted to the frame of the saw by a pin 332. The pin is mounted to the saw in such a way that it may not pivot up and down with the blade. When the blade hits the pawl, the blade climbs down the pawl, or in other words, moves generally around the point of contact with the pawl. The pawl and blade do not pivot downward together, as in the embodiment shown in FIGS. 23 and 24, because the pawl is fixed to the frame of the saw. In this embodiment, the blade retracts by "climbing" down the pawl.

Figure 26:
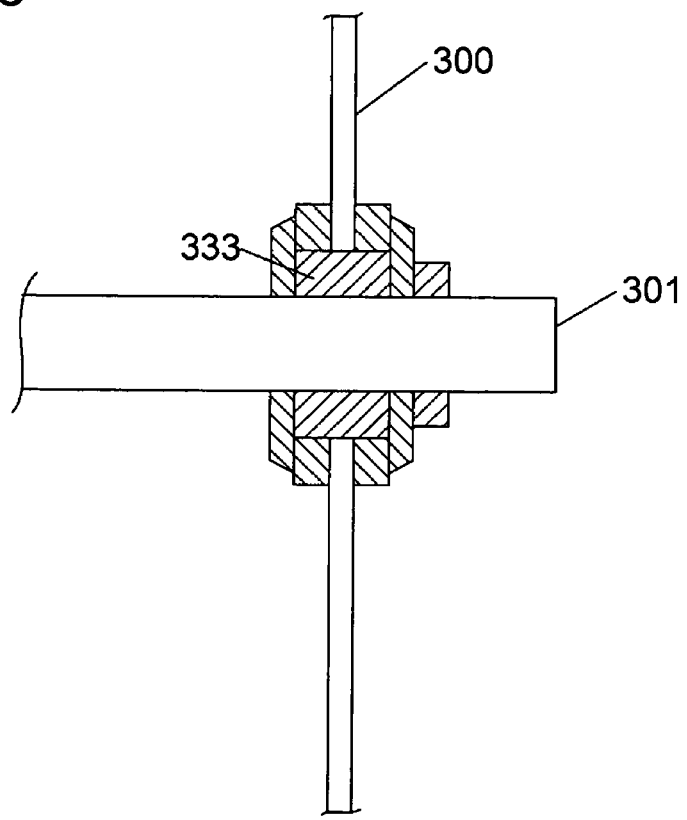
FIG. 26 is a section view of a retraction system using a deformable bushing.

Another embodiment of a retraction system comprises a compressible bushing. Typically, a blade 300 in a table saw, miter saw or other machine is mounted to an arbor over a bushing 333, as shown in FIG. 26. A locking nut, washers and an arbor flange are used to secure the blade to the arbor. Bushing 333 may be constructed from a material that is soft enough to deform when the blade is stopped suddenly. For example, depending on the type of braking system used, a substantial radial impact load may be transmitted to the arbor when the brake is actuated. A deformable bushing can be used to absorb some of this impact and reduce the chance of damage to the arbor. In addition, proper positioning of the brake in combination with a deformable bushing may be employed to cause the blade to move away from the user upon activation of the brake. Where a plastic bushing is placed between the blade and the arbor, the substantial force created by stopping the blade almost instantly may cause the bushing to deform. Typically, the edge of the mounting hole of the blade will bite into the bushing as the blade attempts to rotate about the pawl. Therefore, if the pawl is mounted at the back of the blade, then the blade will tend to move downward into the bushing and away from the user when the pawl engages the blade.

Figure 27:
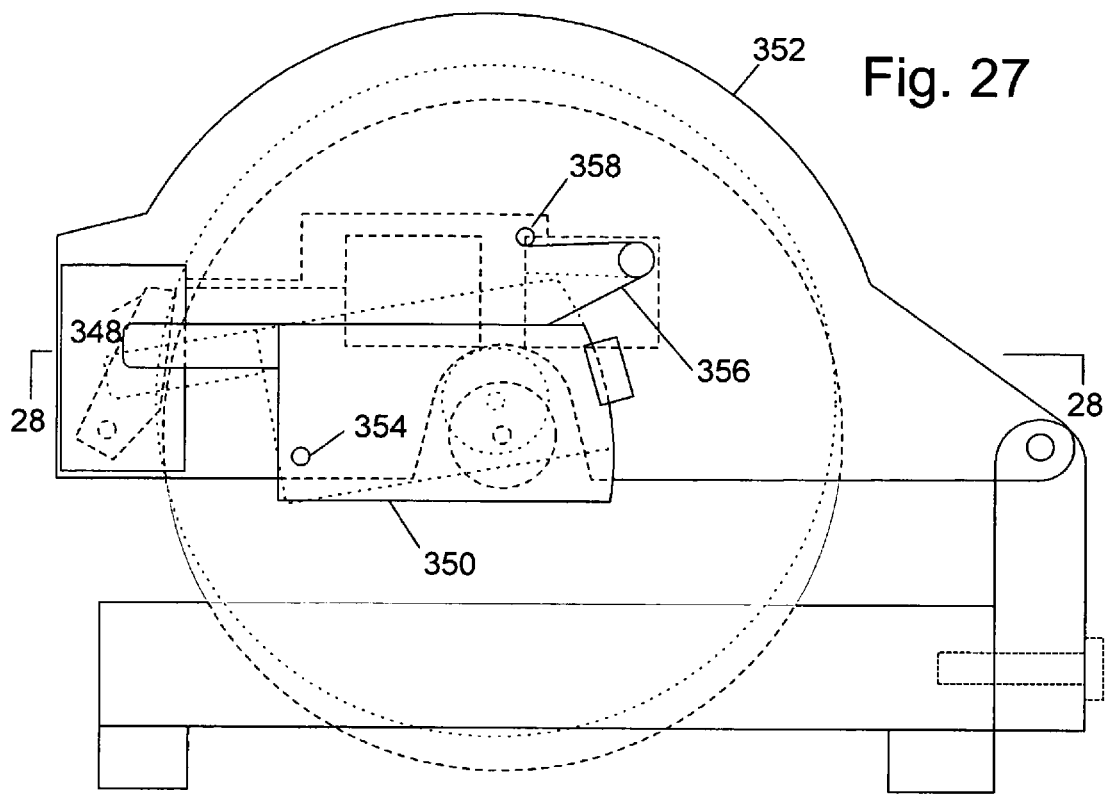
FIG. 27 is a schematic side view of a miter saw with a retraction system.
Figure 28:
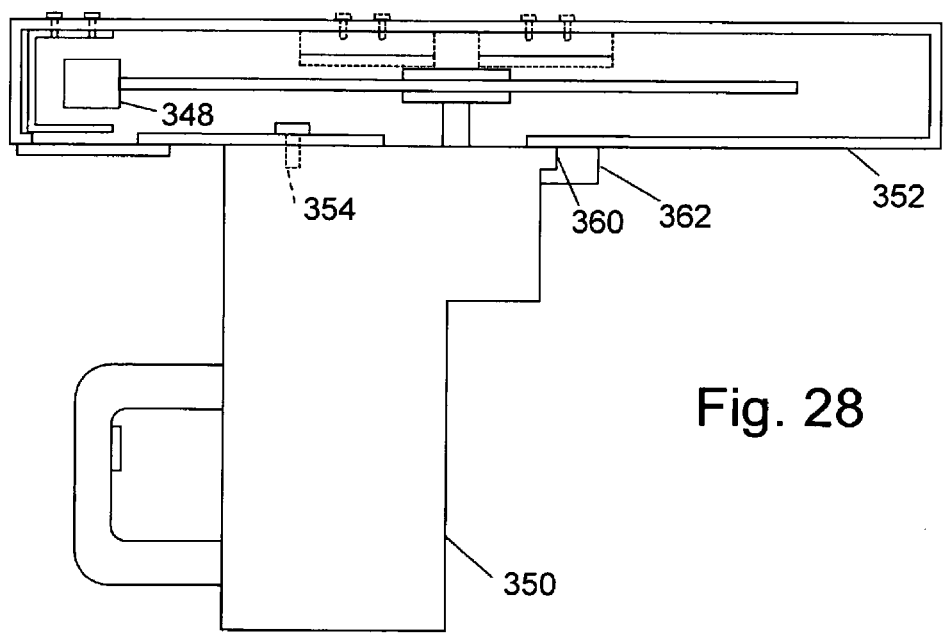
FIG. 28 is a section view of the miter saw shown in FIG. 27.

FIGS. 27 and 28 show a miter saw equipped with both a brake and a retraction system. The miter saw is configured with a pivotal motor assembly to allow the blade to move upward into the housing upon engagement with a brake pawl 348. Motor assembly 350 is connected to housing 352 via pivot bolt 354, allowing the motor assembly to pivot about bolt 354 in the direction of blade rotation. A spring 356 is compressed between the motor assembly and an anchor 358 to bias the motor assembly against the direction of blade rotation. The motor assembly may include a lip 360, which slides against a flange 362 on the housing to hold the end of the motor assembly opposite the pivot bolt against the housing.

When the saw is in use, spring 356 holds the motor assembly in a normal position rotated fully counter to the direction of blade rotation. However, once the pawl is released to engage the blade, the motor assembly and blade pivot upward against the bias of the spring. In this embodiment, the pawl is positioned at the front of the blade so that the pivot bolt 354 is between the pawl and the arbor. This arrangement encourages the blade to move upward into the housing when stopped. The spring is selected to be sufficiently strong to hold the motor assembly down when cutting through a workpiece, but sufficiently compressible to allow the blade and motor assembly to move upward when the blade is stopped. Of course, the blade and motor assembly may be configured in any of a variety of ways to at least partially absorb the angular momentum of the blade.

Figure 29:
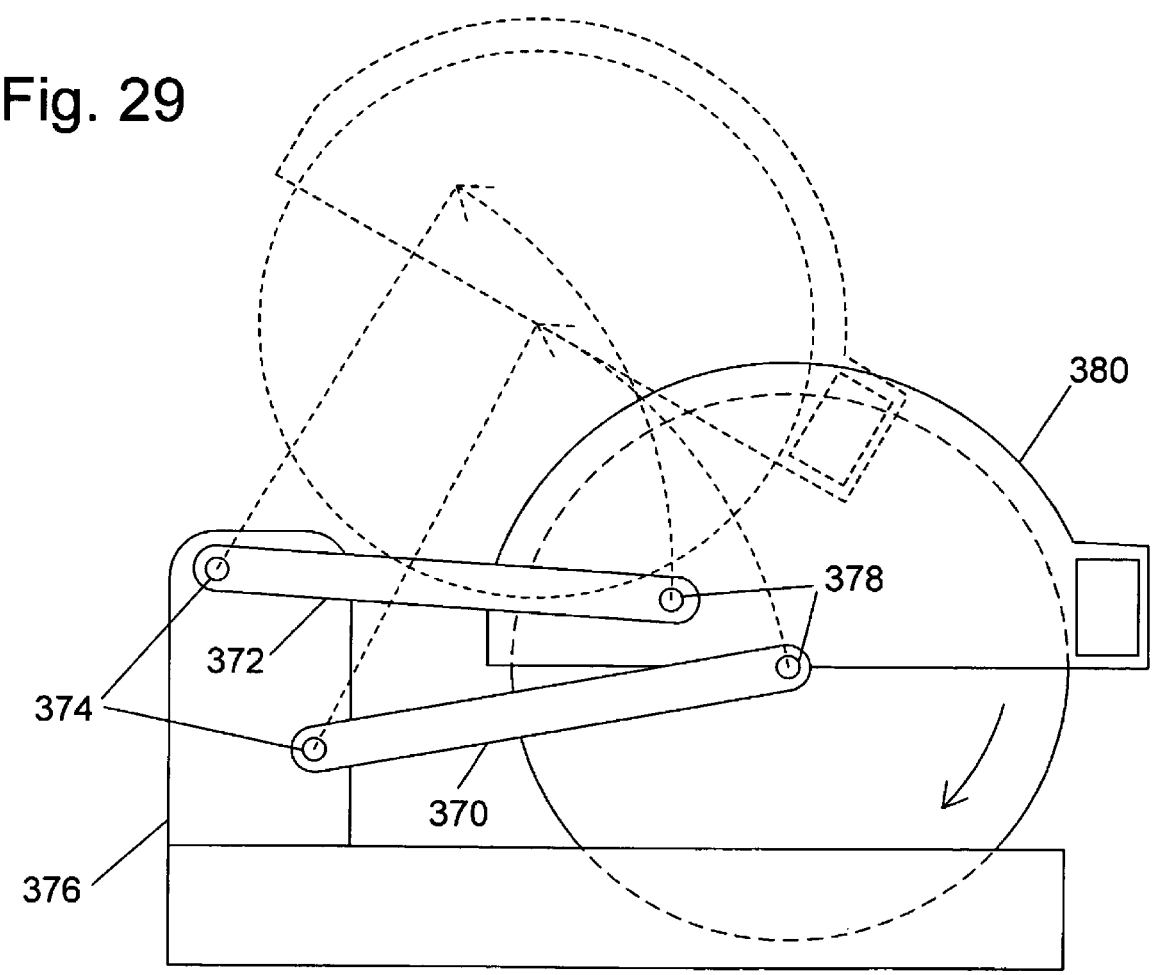
FIG. 29 shows another embodiment of a miter saw with a retraction system.

FIG. 29 shows an alternative configuration of a miter saw adapted to move away from an accidental contact with a user by absorbing the angular momentum of the blade. In this configuration, the miter saw includes two swing arms 370 and 372. One end 374 of each swing arm 370, 372 is connected to base 376, and the opposite end 378 of each swing arm is connected to housing 380, the blade, and/or the motor assembly (not shown). The position of the swing arms relative to each other may vary depending on the swing arm motion desired. In FIG. 29, swing arm 370 is connected to base 376 somewhat below and forward of swing arm 372. Typically, the motor assembly is rigidly attached to end 378 of swing arm 370, while housing 380 is connected to rotate about end 378 of swing arm 370. End 378 of swing arm 372 is connected only to the housing. Alternatively, the motor assembly may be connected to rotate about end 378 of swing arm 370 along with the housing.

The geometry of the configuration shown in FIG. 29 causes the housing and/or motor assembly to rotate as the swing arms pivot. Significantly, when the swing arms move upward, the housing and/or motor assembly rotate in the same direction in which the blade rotates during cutting. As a result, when a brake pawl engages the blade and transfers the angular momentum of the blade to the housing and/or motor assembly, the housing and/or motor assembly tend to rotate in the same direction as the blade. This causes the swing arms to pivot upward, drawing the blade away from the workpiece and the user's body. Thus, the miter saw configuration illustrated in FIG. 29 is adapted to absorb the angular momentum of the blade and translate that angular momentum into an upward force on the swing arms.

Figure 30:
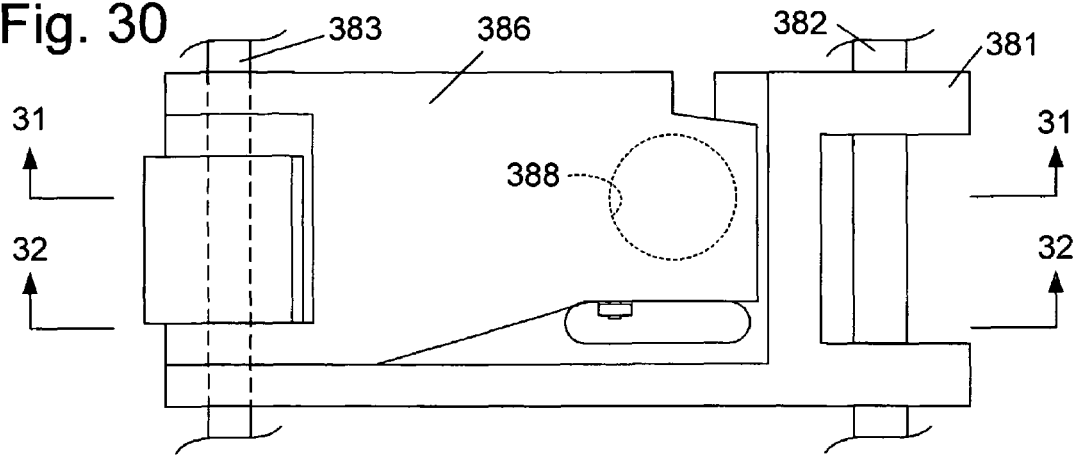
FIG. 30 shows a schematic drawing of a retraction system using a spring to retract a cutting tool.
Figure 31:
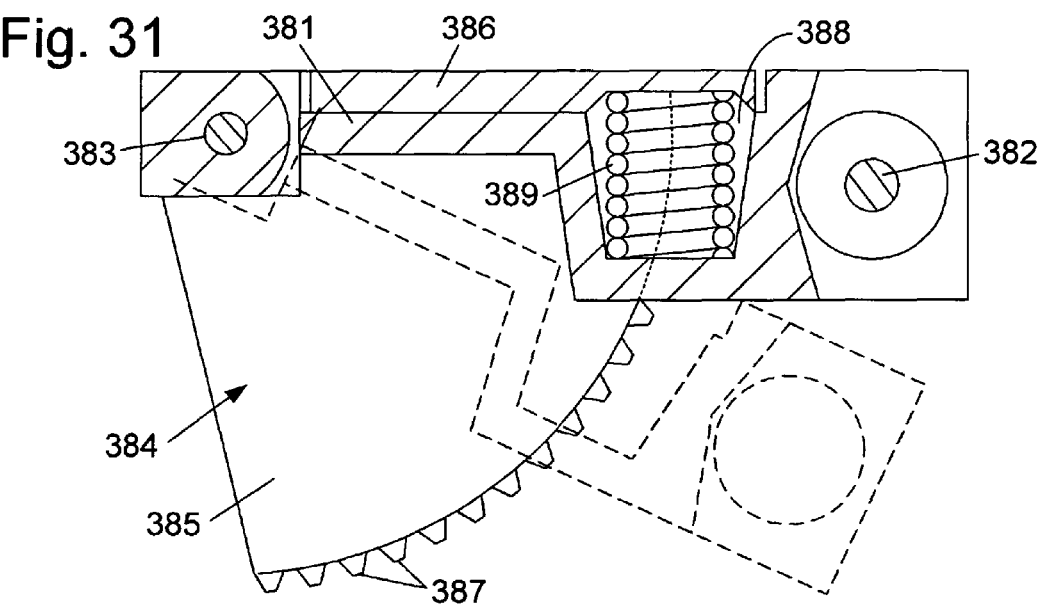
FIG. 31 is a sectional view of the retraction system shown in FIG. 30.
Figure 32:
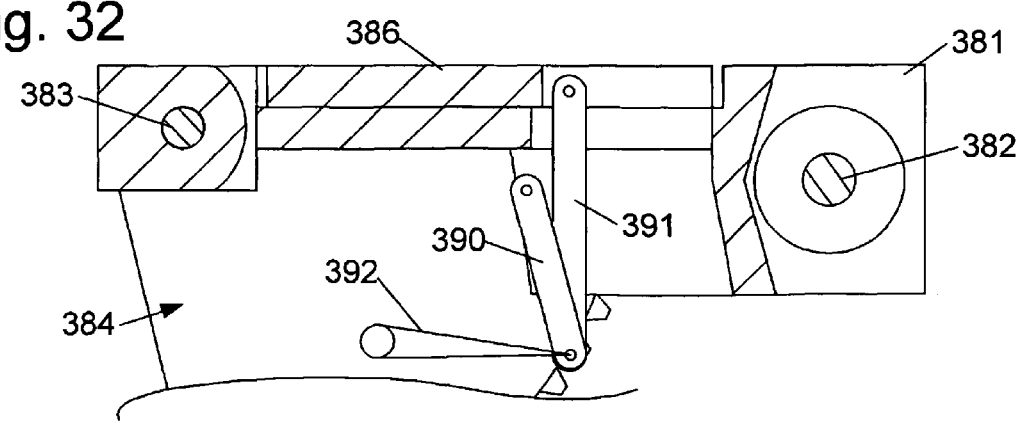
FIG. 32 also is a sectional view of the retraction system shown in FIG. 30.

In any of the systems described above, a spring or other force can be used to push the blade away from the point of contact with the user. The spring could be released by a mechanism similar to the mechanism that releases the pawl to strike the blade. FIGS. 30-32 show how a spring may be used to retract a blade in a table saw. FIG. 30 is a top view and FIGS. 31 and 32 are side views of an arbor block 381 holding an arbor 382 used to drive a blade (not shown). Arbor block 381 is pivotally mounted to pin 383 so that the arbor block and blade may pivot up and down to adjust the position of the blade in the saw.

A segment gear 384, like rack 310 described above in connection with FIGS. 23 and 24, is also mounted on pin 383, and is connected to arbor block 381 in the manner described below, to raise and lower the arbor. Segment gear 384 includes a side portion 385 positioned substantially perpendicularly to the plane of arbor block 381, and a top portion 386 positioned over arbor block 381. The side portion 385 includes gear teeth 387 to engage a worm gear to raise and lower the arbor block. Side portion 385 and top portion 386 are connected to each other and move together. Top portion 386 extends over the top of the entire arbor block, as shown. The arbor block is constructed with a region to accommodate top portion 386 so that top portion 386 does not extend substantially above the arbor block, which could limit the ability of the arbor block and blade to pivot upward when desired, such as by contacting the underside of a table in a table saw.

A pocket 388 is formed in arbor block 381 to house a spring 389. In the position shown in FIG. 31, spring 389 is compressed between top portion 386 of segment gear 384 and arbor block 381 because the segment gear and arbor block are coupled together.

The segment gear and arbor block are coupled by a compound linkage having, as shown in FIG. 32, a first arm 390 attached at one end to the arbor block and at its other end to a second arm 391. The second arm, in turn, is attached to top portion 386 of segment gear 384, as shown. First and second arms 390 and 391 are hingedly connected to each other, and to the arbor block and segment gear. The arms are configured so that the force of the spring pushing apart the arbor block and the top portion of the segment gear biases the first and second arms in such a way that the arms want to move. A fusible member 392, which may take the form of a wire as described above, restrains the arms from movement. Of course, numerous different linkages may be used, and numerous types and configurations of fusible members or other release mechanisms may be used. The linkage may be selected to provide a sufficient mechanical advantage so that the arbor block and top portion of the segment gear may be held together with as thin a fusible member as possible, so that the fusible member may be burned as easily as possible. Various analogous compound linkages are described in U.S. Provisional Patent Application Ser. No. 60/225,170, entitled "Spring-Biased Brake Mechanism for Power Equipment," filed Aug. 14, 2000. The fusible member may be burned by a system as described above, or as described in more detail in U.S. Provisional Patent Application Ser. No. 60/225,056, entitled "Firing Subsystem for Use in Fast-Acting Safety System," filed Aug. 14, 2000. The compound linkage and the fusible member are preferably configured so that they accommodate spring forces of 100 to 500 pounds or more.

When the fusible member is burned, the compound linkage is free to move, and the spring pushes arbor block 381 down, away from top portion 386 of the segment gear, as shown by the dashed lines in FIG. 31, thereby retracting the blade. The stronger the spring, the faster the blade will be retracted. The segment gear does not move because it is coupled through teeth 387 to a worm gear or some other structure.

Retracting a blade by a spring or some other force may be thought of as direct retraction. A spring or other force may be used with some other retraction system to increase the speed that a cutting tool retracts, or a spring or other force may be used as the sole means of retraction. The systems for direct retraction described above may be used on various pieces of equipment, including table saws, miter saws and band saws.

Figure 33:
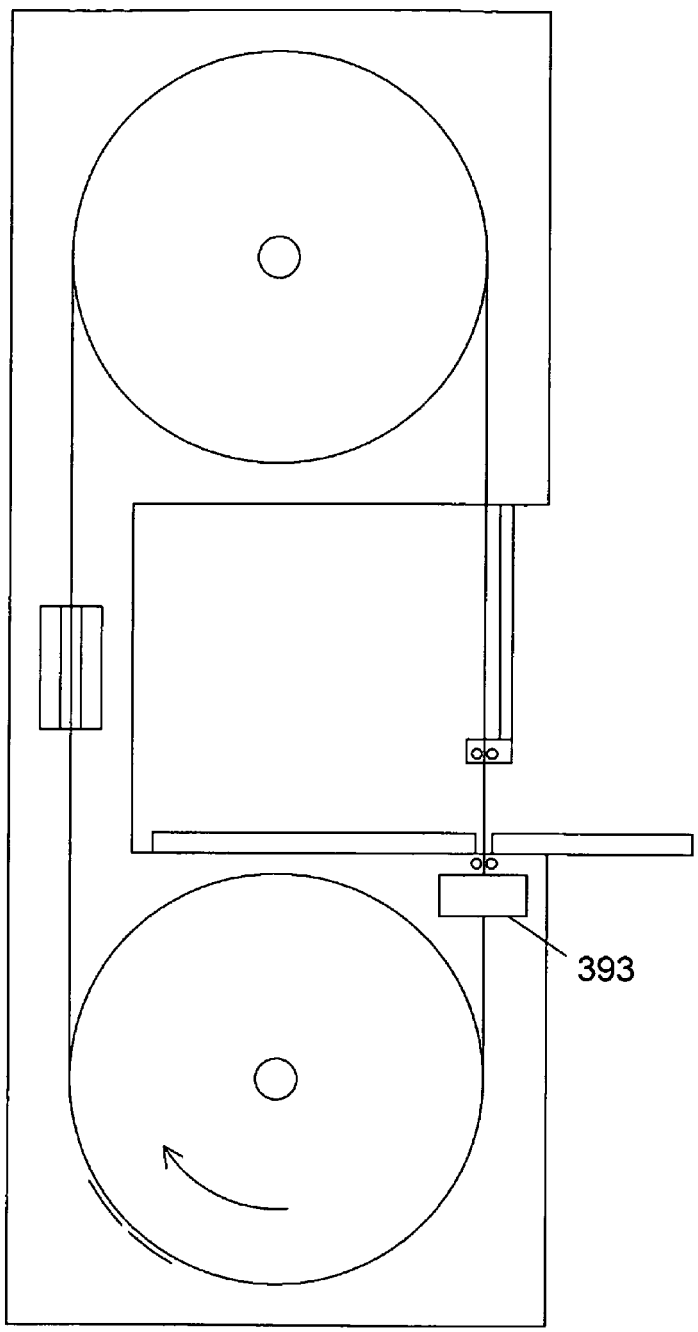
FIG. 33 is a schematic view of a band saw with a retraction system.

FIG. 33 is a schematic diagram of a system to retract the blade of a band saw. Typically, a band saw includes a main housing enclosing a pair of vertically spaced-apart wheels. The perimeter of each wheel is coated or covered in a high-friction material such as rubber, etc. A relatively thin, continuous loop blade tightly encircles both wheels. A workpiece is cut by passing it toward the blade in a cutting zone between the wheels. The workpiece is passed toward the blade on a table, which forms the bottom of the cutting zone.

Figure 34:
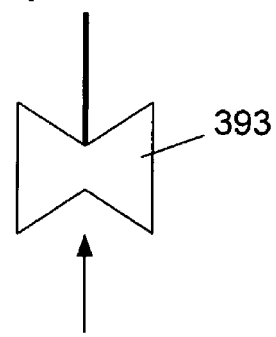
FIG. 34 is a top view of a roller used in the system shown in FIG. 33.

The band saw shown in FIG. 33 includes roller 393 positioned adjacent the blade. The roller is configured to contact the blade and push the blade away from the point of accidental contact with a user. In addition, the roller may be configured to push the blade off the wheels, thereby stopping the motion of the blade. A top view of the roller is shown in FIG. 34 pushing against a blade in the direction of the arrow. The roller may be part of a cartridge, and may be released into the blade just as the pawls described above are released. The roller should have a diameter large enough so that the roller can roll over the teeth of the blade.

The systems for direct retraction of a cutting tool may also be implemented on hand-held circular saws. Such saws typically include a base plate that contacts a workpiece during sawing. The base plate supports the saw on the workpiece. The base plate may be configured so that it is pushed down when the blade contacts a user. The result of that action is to effectively retract the blade because the base plate would push the user away from the blade.

FIG. 35 illustrates one embodiment of a reaction system adapted to disable the dangerous portions of a cutting tool. In the embodiment of FIG. 35, the cutting tool is a generally cylindrical cutting head having one or more elongate blades mounted on the outer surface of the cutting head. Such cutters are used in jointers, such as jointer 1200, and planers. In operation, the cutting head is rotated about its cylindrical axis. When a workpiece is passed across the cutting head, the blades make wide cuts into the adjacent surface of the workpiece. As with machines using circular blades described above, machines using cylindrical cutting heads may also cause severe injury if the blades come into contact with the user's body during operation. The reaction subsystem of FIG. 35, indicated at 24, is designed to prevent or minimize such injury. For clarity, many of the components of safety system 18 are not shown in FIG. 35 since they are similar to the components described above in the context of other cutting machines described in the applications incorporated by reference above.

Jointer 1200 includes a generally cylindrical cutterhead 1202 mounted to rotate on an arbor 1204. The arbor typically is mounted in one or more bearing assemblies (not shown) and rotationally driven by a motor assembly (not shown), which is coupled to the arbor either directly or by a belt-and-pulley system. The cutterhead is mounted in a main frame assembly 1206 to extend upward in the space between infeed table 1208 and outfeed table 1210. A workpiece is cut by sliding it along infeed table 1208, past the cutterhead and onto outfeed table 1210. Typically, the vertical positions of the infeed and outfeed tables are independently adjustable to control the depth of cut into a workpiece and alignment with the upper surface of the cutterhead.

The cutterhead is usually constructed of metal, such as steel, and typically includes three knife blades 1212 mounted to extend above the surface of the cutterhead. It will be appreciated that fewer or more knife blades may be used and that the utility of safety system 18 is not limited by the number of blades on cutterhead 1202. One or more electrically nonconductive bushings 1214 are placed between the cutterhead and arbor to insulate the cutterhead and blades from frame 1206. Charge plates 44 and 46 may be placed adjacent the cutterhead to couple the signal generated by detection subsystem 22 across the cutterhead. In FIG. 35, the charge plates (shown in dashed lines) are mounted adjacent one flat end of the cutterhead. Alternatively, the arbor may be insulated from the frame and the charge plates may be positioned around the arbor as described above in U.S. Provisional Patent Application Ser. No. 60/225,211, filed Aug. 14, 2000, entitled "Apparatus And Method For Detecting Dangerous Conditions In Power Equipment," and U.S. patent application Ser. No. 09/929,221, filed Aug. 13, 2001, entitled "Apparatus And Method For Detecting Dangerous Conditions In Power Equipment," which are incorporated herein by reference.

Due to the relatively few blades, first contact between the user's body and the cutterhead may be on one of the blades or on the surface of the cutterhead itself. However, the blades and cutterhead are electrically coupled so that any contact with the user's body is detected regardless of whether or not it occurs on the blades. Once contact is detected, the reaction system is actuated to quickly stop the rotation of cutterhead 1202 and/or disable the blades.

In the embodiment depicted in FIG. 35, safety system 18 includes a reaction system 24 configured to cover the blades to prevent them from causing injury to the user. Specifically, the reaction system of FIG. 35 includes a flexible sheet 1220 such as plastic, rubber, metal foil, metal sheet, metal mesh, fabric, etc., configured to cover the blades. A particularly preferred material is stainless steel sheet 0.005-0.050 inches thick. Sheet 1220 includes a hook 1222 disposed at one end to engage any of the blades 1212. The hook is preferably formed integrally with the sheet in the form of a short fold shaped to catch on a blade. Alternatively, the hook may be separate and joined to the sheet. When hook 1222 is pushed against cutterhead 1202, the next passing blade catches the hook, causing sheet 1220 to wrap around the cutterhead as it rotates. Thus, the blades are covered by sheet 1220, which protects the user from serious injury. Typically, the outer surface of hook 1222 is rounded or beveled to prevent injury to the user when the hook is pulled around the cutterhead.

The sheet preferably extends across the entire width of the cutterhead and is preferably longer than two-thirds of the circumference of the cutterhead to allow it to cover all three blades simultaneously. More preferably, the sheet should be longer than the circumference of the cutterhead to wrap more than once around the head. The sheet is typically formed with an inward curl. The curl reduces the tendency of the sheet to spring away from the cutter head. The free end of the sheet is stored around a spool 1224. The spool may include a torsion spring or other device to limit the number of rotations the spool can undergo, thereby pulling the cutterhead to a stop. Alternatively, the end of material 1220 opposite the hook may be anchored to stop the cutterhead before it makes a full rotation. Additionally or alternatively, the jointer motor assembly may be shut off to stop rotation of the cutterhead.

The hook is moved into contact with the cutterhead by being mounted to the front of a drive plate 1226 or other high speed actuator assembly. The hook may be spot welded or adhesively attached to the plate, secured thereto with soft rivets, or may be provided with several holes through which protrusions on the plate can be pushed. The attachment needs to hold the hook securely during normal use, while allowing it to split away when caught by a blade. The drive plate is preferably substantially as wide as the hook to provide sufficient rigidity to insure that the entire hook engages a blade simultaneously.

Figure 38:
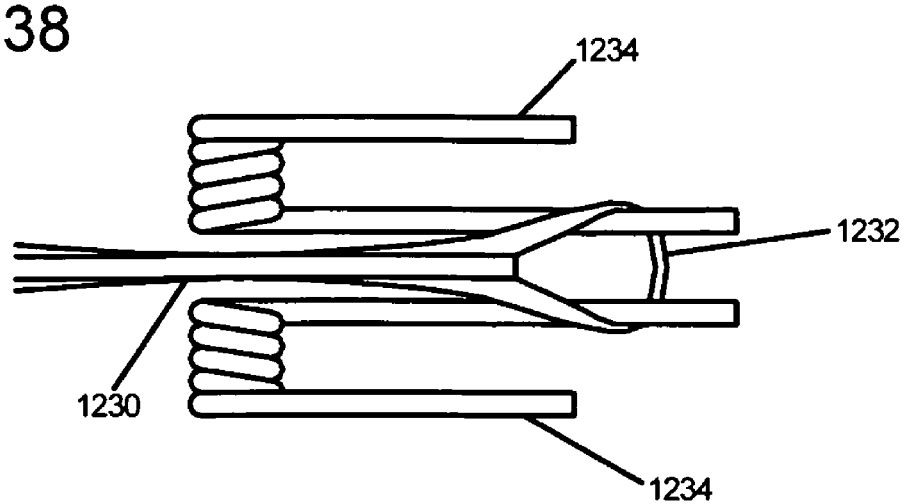
FIG. 38 is a top elevation view of a hook on the end of the band of FIG. 37.

FIGS. 36-38 illustrate an alternative blade covering system for a machine using a circular blade. The reaction system of FIG. 36 includes a band 1230 of flexible material that is used to wrap around the teeth of blade 40. Band 1230 includes a loop 1232 formed at the leading end. The loop is hooked around a pair of torsion springs 1234 and held in place by a guide structure (not shown) secured to the frame of the saw.

The springs are held in a cocked position by a fast-acting release system (not shown), such as described above and in U.S. Provisional Patent Application Ser. No. 60/225,056, filed Aug. 14, 2000, entitled "Firing Subsystem For Use In A Fast-Acting Safety System," U.S. patent application Ser. No. 09/929,240, filed Aug. 13, 2001, entitled "Firing Subsystem For Use In A Fast-Acting Safety System," U.S. Provisional Patent Application Ser. No. 60/225,170, filed Aug. 14, 2000, entitled "Spring-Biased Brake Mechanism For Power Equipment," and U.S. patent application Ser. No. 09/929,227, filed Aug. 13, 2001, entitled "Spring-Biased Brake Mechanism For Power Equipment," which are incorporated herein by reference. When the springs are released, they pull loop 1232 down into a gullet 1236 of blade 40. The gullet captures the leading edge of the loop and pulls the loop off of the springs and drags the band forward as illustrated by the dashed lines in FIG. 36. The width of the loop forms a shock absorbing structure to absorb some of the impact of the gullet catching the loop. It is also possible to provide a compressible material at the leading end of the loop as a shock absorbing system to reduce impact loading.

The trailing section of the band is shaped to fold over the teeth of the blade, as shown in FIG. 37. The trailing section of the band is stored on a spool 1238. The C-shape of the band flattens out when the band is wound on the spool. The band is preferably formed of a spring-temper material to return to an unbiased C-shape when curved to match the perimeter of the blade, such as spring temper stainless steel of 0.005 to 0.050 thickness.

The leading end of the band is preferably positioned as close as possible to the location where the blade emerges from the guard or housing on the saw. This insures that the band will reach the location of the user as soon as possible to minimize injury. The motor of the saw will preferably be disengaged as soon as the reaction system is actuated. In addition, the reaction system of FIGS. 36-38 is also preferably used in connection with translation stopping systems such as described in U.S. Provisional Patent Application Ser. No. 60/225,210, filed Aug. 14, 2000, entitled "Translation Stop For Use In Power Equipment," and U.S. patent application Ser. No. 09/929,425, filed Aug. 13, 2001, entitled "Translation Stop For Use In Power Equipment," or retraction systems such as shown in U.S. Provisional Patent Application Ser. No. 60/225,089, filed Aug. 14, 2000, entitled "Retraction System For Use In Power Equipment," and U.S. patent application Ser. No. 09/929,242, filed Aug. 13, 2001, entitled "Retraction System For Use In Power Equipment," which are incorporated herein by reference, to further minimize injury.

Figure 39:
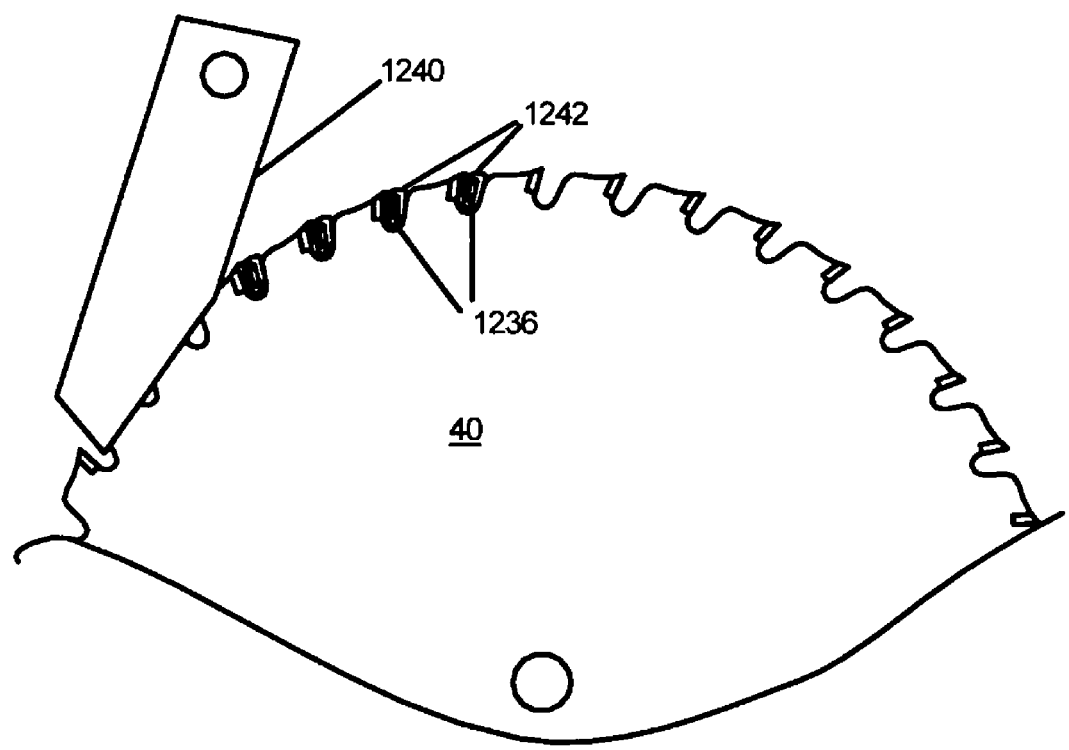
FIG. 39 is a schematic view of an alternative reaction system for obstructing a blade.

FIG. 39 illustrates another alternative reaction system in which the cutter is obstructed upon actuation of the reaction system. In particular, a pawl 1240 is pushed into contact with the teeth of blade 40 upon actuation of the reaction system. The pawl is preferably formed from a plastic material, such as polycarbonate, that forms curls 1242 in gullets 1236 between the teeth upon being cut by the teeth. The curls block the sharp edges of the teeth to prevent the teeth from cutting into a user. The pawl may also be constructed from material softer than polycarbonate, such as ultra-high molecular weight polyethylene (UHMWPE) to reduce the braking effect on the blade as the curls are formed. The blade should preferably have gullets that are shaped with relatively parallel sides to minimize the tendency of the curls to slip out. As with the band system described above, it is preferable that the pawl be located as close as possible to where the blade emerges from the guard or housing to minimize the number of unblocked teeth to which the user is exposed. Of course, the same principle can be applied to other cutters, such as a jointer or shaper, with appropriate modification.

Figure 40:
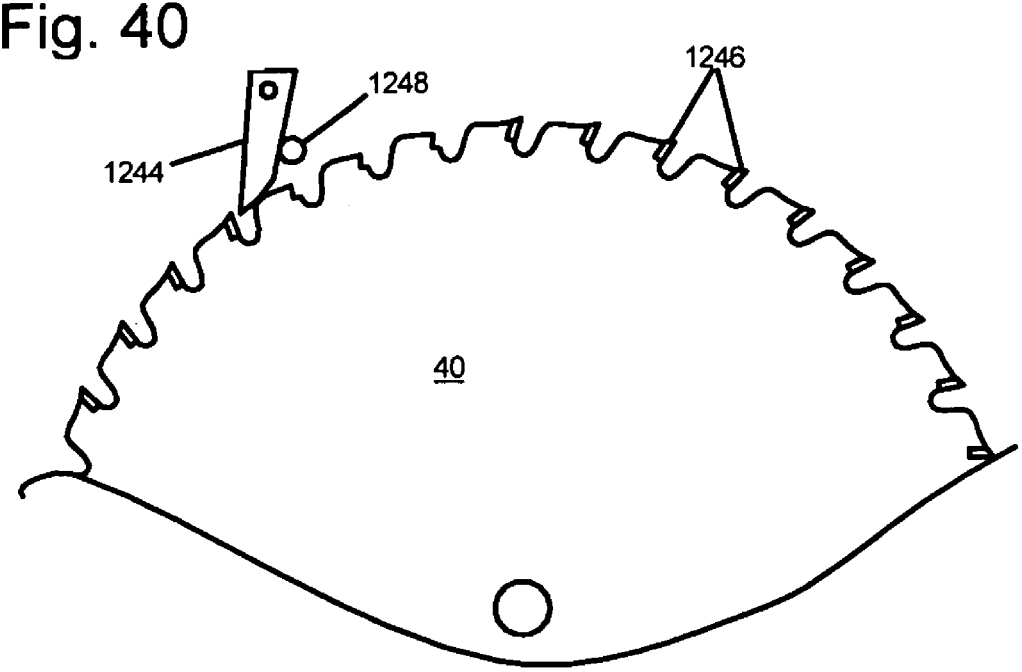
FIG. 40 is a schematic view of an alternative reaction system that breaks the teeth of a blade.

FIG. 40 illustrates another alternative reaction system in which the teeth on the cutter are broken or shifted. A pawl 1244 is provided to selectively engage the teeth of blade 40. The pawl is formed of a material hard enough to dislodge or break the carbide inserts 1246 on the teeth upon contact. Suitable materials would include carbide and hardened steel. The pawl is actuated by the mechanism described above for brake pawl 60. When actuated, the pawl shifts into the path of the teeth of the blade, as illustrated in FIG. 40. The pawl shifts into contact with a brace structure 1248 adapted and positioned to support the pawl against the teeth. Brace structure may be in any suitable form including a pin, post, bracket, etc. In any event, the carbide inserts are shattered by the impact from striking the pawl. This reaction system is preferably used in conjunction with translation stopping systems or retraction systems, and serves primarily to generate sufficient user-to-blade clearance to give the translation or retraction system more time to operate.

Figure 41:
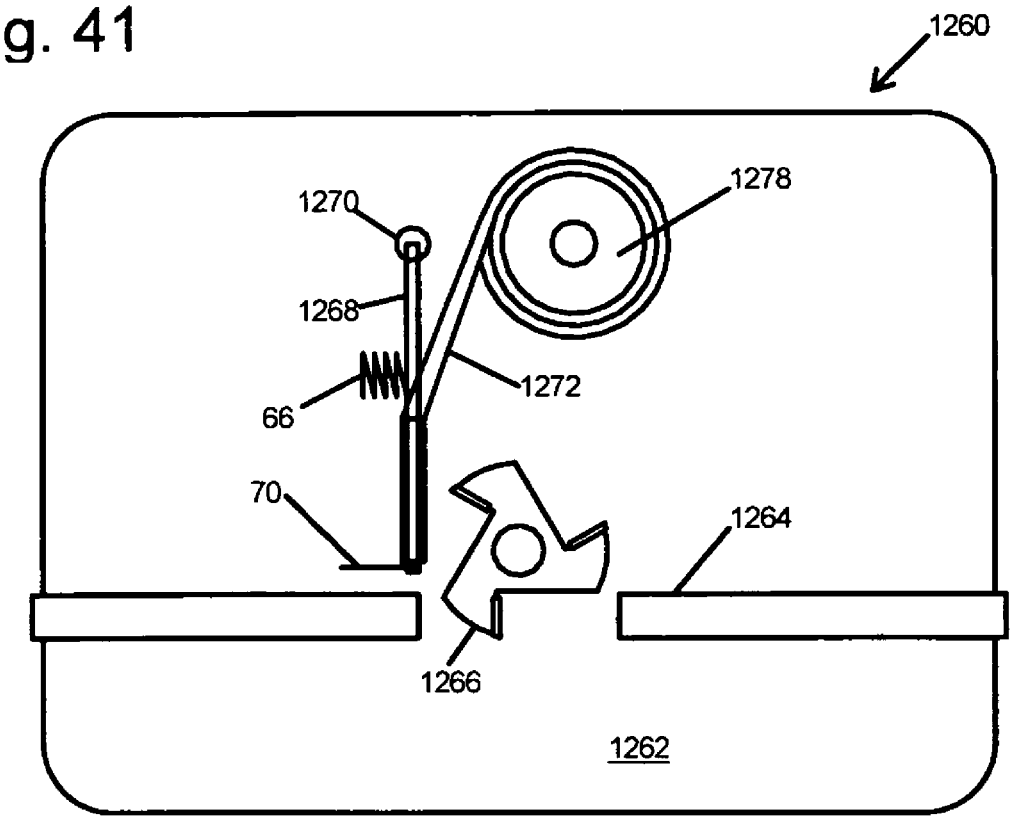
FIG. 41 is a top view of an alternative reaction system that wraps a cutting tool.
Figure 42:
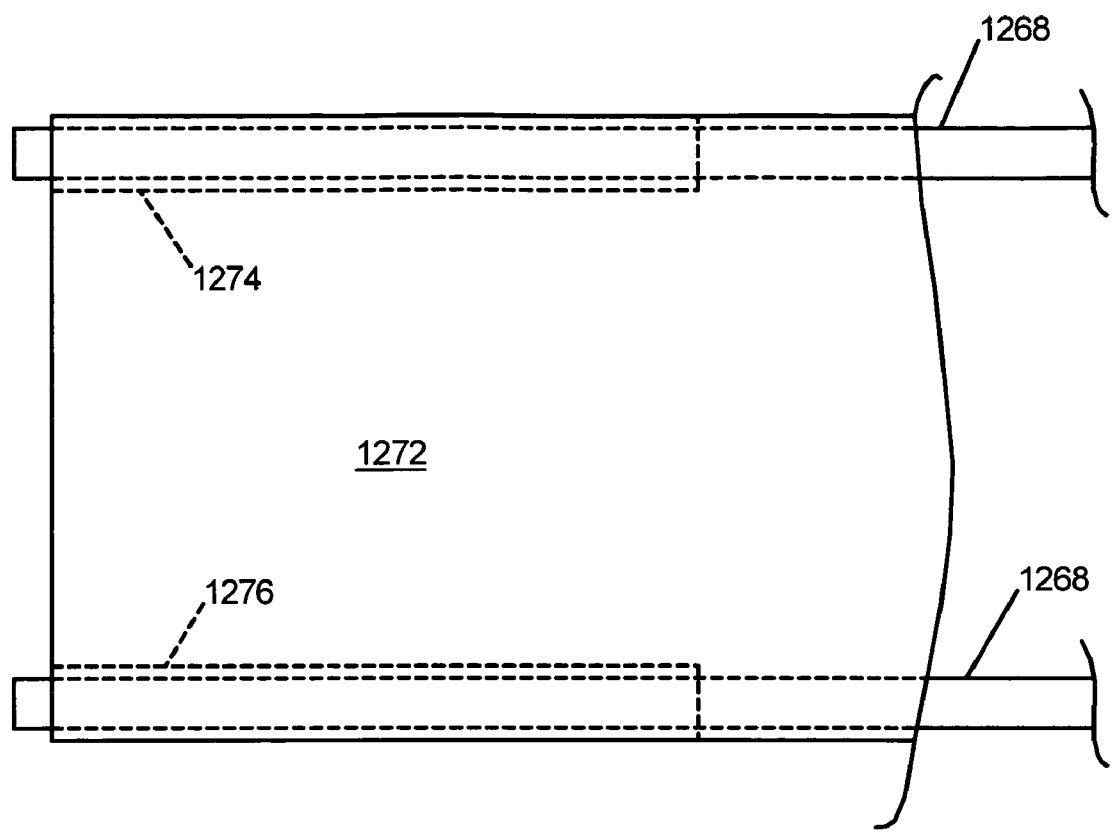
FIG. 42 shows a covering used in the reaction system of FIG. 41.

FIGS. 41 and 42 illustrate another embodiment of a reaction system in which a cutting tool is wrapped with a covering. A shaper is shown at 1260 with a work surface 1262, a fence 1264 and a cutting head 1266. A workpiece is slid on the work surface and along the fence past the cutting tool. The cutting tool shapes the workpiece at is moves past. The safety system on shaper 1260 includes a pair of vertically spaced shafts 1268 that pivot around pin 1270. Shafts 1268 are biased toward cutting head 1266 by spring 66, as explained above in connection with other embodiments. A fusible member 70 restrains shafts 1268 from pivoting toward the cutting head. A covering 1272, which takes the form of a sheet of material, is mounted between the two shafts as shown in FIG. 42. The covering is mounted to the shafts by pockets 1274 and 1276 formed in the material. The shafts are slipped into the pockets so that the covering spans the area between the shafts. The pockets extend along the upper and lower edges of the covering on the end of the covering adjacent the shafts. The covering extends away from the shafts and is wound on a spool 1278. When the system detects accidental contact with cutting head 1266, as described above in connection with other embodiments, fusible member 70 is burned and shafts 1268 are released to pivot toward the cutting head because of spring 66. When shafts 1268 move toward the cutting head, the covering contacts the cutting head and the cutting head catches on or bites into the covering and pulls the covering off of shafts 1268 and off of spindle 1278 until the covering has wrapped the cutting head. The covering can be any material sufficiently strong to absorb the sudden acceleration when caught on the cutting head, and sufficiently pliable to catch on the cutting head and wrap around it. Possible materials include Kevlar fabric, stainless steel mesh, natural or synthetic fabrics, etc. The covering may be used in connection with an internal brake to more rapidly slow the cutting head or the power to the motor may be disengaged to stop the cutting head.

The various embodiments described above for covering, blocking or disabling the cutter are particularly suitable for use on relatively light machinery, such as portable circular saws and miter saws, or on machinery with relatively heavy cutters such as jointers, shapers and planers.

Machines that include various components and features discussed above may be described as follows:

1) A cutting machine comprising a cutter; a brake adapted to stop the cutter, where the brake has an idle position and a braking position; and an actuation system adapted to selectively move the brake from the idle position to the braking position, where at least a portion of the actuation system must be replaced after moving the brake from the idle position to the braking position; wherein the actuation system includes an explosive device; and/or 2) A cutting machine comprising a support structure; a cutting tool adapted to cut a workpiece, where the cutting tool is supported by the support structure; a detection system adapted to detect a dangerous condition between the cutting tool and a person; a reaction system adapted to perform a specified action upon detection of the dangerous condition; an explosive to trigger the reaction system to perform the specified action upon firing of the explosive; and a firing subsystem to fire the explosive upon detection of the dangerous condition.

It is believed that the disclosure set forth above encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the inventions includes all novel and non-obvious combinations and subcombinations of the various elements, features, functions and/or properties disclosed herein. No single feature, function, element or property of the disclosed embodiments is essential to all of the disclosed inventions. Similarly, where the claims recite "a" or "a first" element or the equivalent thereof, such claims should be understood to include incorporation of one or more such elements, neither requiring nor excluding two or more such elements.

It is believed that the following claims particularly point out certain combinations and subcombinations that are directed to one of the disclosed inventions and are novel and non-obvious. Inventions embodied in other combinations and subcombinations of features, functions, elements and/or properties may be claimed through amendment of the present claims or presentation of new claims in this or a related application. Such amended or new claims, whether they are directed to a different invention or directed to the same invention, whether different, broader, narrower or equal in scope to the original claims, are also regarded as included within the subject matter of the inventions of the present disclosure.

The invention claimed is:

1. A woodworking machine comprising:
   a support frame;
   a motor supported by the frame;
   a cutting tool supported by the frame and moveable by the motor;
   a detection system adapted to detect a dangerous condition between a person and the cutting tool;
   a mechanism having a moveable component adapted to move upon detection of the dangerous condition by the detection system, where movement of the moveable component contributes to one or more of the following actions to mitigate or prevent injury to the person: deceleration of the cutting tool, and retraction of the cutting tool; and
   an actuator having stored energy sufficient to move the moveable component $\frac{1}{32}^{nd}$ of an inch within approximately 3 milliseconds or less after the dangerous condition is detected.

2. The machine of claim 1, where the actuator includes one or more springs.

3. The machine of claim 2, where the one or more springs are adapted to apply at least 50 lbs. of force to move the moveable component.

4. The machine of claim 2, where the one or more springs are adapted to apply at least 100 lbs. of force to move the moveable component.

5. The machine of claim 1, where the actuator is adapted to move the moveable component at an acceleration of over 500 ft/s$^2$ when the detection system detects the dangerous condition.

6. The machine of claim 1, where the actuator is adapted to move the moveable component at an acceleration of over 2000 ft/s$^2$ when the detection system detects the dangerous condition.

7. The machine of claim 1, where the movement of the moveable component contributes to the deceleration of the cutting tool.

8. The machine of claim 7, where the moveable component is a brake.

9. The machine of claim 1, where the movement of the moveable component contributes to deceleration of the cutting tool and to retraction of the cutting tool.

10. The machine of claim 1, where the support frame includes a table and the cutting tool comprises a blade adapted to extend at least partially above the table.

11. The machine of claim 10, where the movement of the moveable component contributes to the retraction of the cutting tool at least partially below the table.

12. The machine of claim 1, where the support frame includes a table and a housing, and where the moveable component is within the housing.

13. A woodworking machine comprising:
   a support frame;
   a motor supported by the frame;
   a cutting tool supported by the frame and moveable by the motor;
   a detection system adapted to detect a dangerous condition between a person and the cutting tool;
   a mechanism having a moveable component adapted to move upon detection of the dangerous condition by the detection system, where movement of the moveable component contributes to the mitigation or prevention of injury to the person; and
   an actuator having stored energy sufficient to move the moveable component $\frac{1}{32}^{nd}$ of an inch within approximately 3 milliseconds or less after the dangerous condition is detected at an acceleration of 500 ft/sec$^2$ or more.

14. The machine of claim 13, where the actuator is adapted to move the moveable component at an acceleration of approximately 2000 ft/s$^2$.

15. The machine of claim 13, where movement of the moveable component contributes to deceleration of the cutting tool.

16. A woodworking machine comprising:
   a support frame;
   a motor supported by the frame;
   a cutting tool supported by the frame and moveable by the motor;
   a detection system adapted to detect a dangerous condition between a person and the cutting tool;
   a mechanism having a moveable component adapted to move upon detection of the dangerous condition by the detection system, where movement of the moveable component contributes to the mitigation or prevention of injury to the person through retraction of the cutting tool; and an actuator having stored energy sufficient to move the moveable component $\frac{1}{32}^{nd}$ of an inch within approximately 3 milliseconds or less after the dangerous condition is detected.

17. The machine of claim 16, where the actuator is configured to move the moveable component at an acceleration of 500 ft/sec$^2$ or more.

18. The machine of claim 16, where the cutting tool is a circular blade and where the mechanism comprises brake means for decelerating the circular blade.

* * * * *